United States Patent
Tejima et al.

(10) Patent No.: US 10,439,218 B2
(45) Date of Patent: *Oct. 8, 2019

(54) ACTIVE MATERIAL, ELECTRODE, SECONDARY BATTERY, BATTERY PACK, AND VEHICLE

(71) Applicant: KABUSHIKI KAISHA TOSHIBA, Minato-ku (JP)

(72) Inventors: Fumihiro Tejima, Kawasaki (JP); Yasuhiro Harada, Isehara (JP); Kazuki Ise, Kawasaki (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 28 days.

This patent is subject to a terminal disclaimer.

(21) Appl. No.: 15/692,685

(22) Filed: Aug. 31, 2017

(65) Prior Publication Data

US 2018/0277842 A1    Sep. 27, 2018

(30) Foreign Application Priority Data

Mar. 24, 2017 (JP) .............................. 2017-058400

(51) Int. Cl.
*H01M 4/485* (2010.01)
*H01M 10/0525* (2010.01)
(Continued)

(52) U.S. Cl.
CPC ............. *H01M 4/485* (2013.01); *B60L 50/64* (2019.02); *B60L 58/12* (2019.02); *B60L 58/21* (2019.02);
(Continued)

(58) Field of Classification Search
CPC ............. H01M 4/485; H01M 10/0525; H01M 2/1077; H01M 2004/027
See application file for complete search history.

(56) References Cited

U.S. PATENT DOCUMENTS

2011/0217593 A1   9/2011  Dollinger et al.
2014/0312269 A1*  10/2014 Laumann ............... C01G 23/00
                                                    252/182.1
(Continued)

FOREIGN PATENT DOCUMENTS

JP        4237659 B2      9/2005
JP     2012-151121        8/2012
(Continued)

OTHER PUBLICATIONS

Nakai et al., "Funmatsu X sen Kaiseki no Jissai", "Reality of Powder X-Ray Analysis", X-Ray Analysis Investigation Conversazione, The Japan Society for Analytical Chemistry, 2002, pp. 107-108.
Fumio Muto et al., "Hydrothermal Synthesis of Sodium Lithium Titanates and Their Crystal Structures," Institute of Inorganic Synthesis, No. 4, (1977), pp. 492-499 (with English Abstract).

*Primary Examiner* — Osei K Amponsah
(74) *Attorney, Agent, or Firm* — Oblon, McClelland, Maier & Neustadt, L.L.P.

(57) ABSTRACT

According to one embodiment, there is provided an active material including particles of a composite oxide having an orthorhombic crystal structure and represented by the general formula $Li_{2+w}Na_{2-x}M1_yTi_{6-z}M2_zO_{14-\delta}$. The particles of the composite oxide have an average crystallite size of 50 nm to 90 nm and an average primary particle size of 0.1 μm to 0.6 μm. M1 is at least one selected from the group consisting of Cs and K. M2 is at least one selected from the group consisting of Zr, Sn, V, Nb, Ta, Mo, W, Fe, Y, Co, Mn, and Al. w falls within $0 \leq w \leq 4$, x falls within $0 < x < 2$, y falls within $0 \leq y < 2$, z falls within $0 < z < 6$, and δ falls within $-0.5 \leq \delta \leq 0.5$.

13 Claims, 12 Drawing Sheets

(51) Int. Cl.
*H01M 2/10* (2006.01)
*C01G 23/00* (2006.01)
*C01G 33/00* (2006.01)
*B60L 58/12* (2019.01)
*B60L 58/21* (2019.01)
*B60L 50/64* (2019.01)
*H01M 4/02* (2006.01)

(52) U.S. Cl.
CPC ......... *C01G 23/005* (2013.01); *C01G 33/006* (2013.01); *H01M 2/1077* (2013.01); *H01M 10/0525* (2013.01); *C01P 2002/60* (2013.01); *C01P 2002/72* (2013.01); *C01P 2002/77* (2013.01); *C01P 2004/03* (2013.01); *C01P 2004/62* (2013.01); *C01P 2006/10* (2013.01); *C01P 2006/12* (2013.01); *C01P 2006/40* (2013.01); *H01M 2004/027* (2013.01); *H01M 2220/20* (2013.01); *Y02E 60/122* (2013.01); *Y02T 10/7011* (2013.01)

(56) References Cited

U.S. PATENT DOCUMENTS

| | | |
|---|---|---|
| 2016/0268592 A1 | 9/2016 | Inagaki et al. |
| 2016/0268603 A1 | 9/2016 | Harada et al. |
| 2017/0005322 A1 | 1/2017 | Harada et al. |

FOREIGN PATENT DOCUMENTS

| | | |
|---|---|---|
| JP | 2013-161654 | 8/2013 |
| JP | 2014-086164 A | 5/2014 |
| JP | 2014-149962 | 8/2014 |
| JP | 5671467 B2 | 12/2014 |
| JP | 2016-171011 A | 9/2016 |
| JP | 6067902 B2 | 9/2016 |
| WO | 2016/088193 A1 | 6/2016 |
| WO | WO 2016-084200 | 6/2016 |
| WO | 2016/121947 A1 | 8/2016 |

* cited by examiner

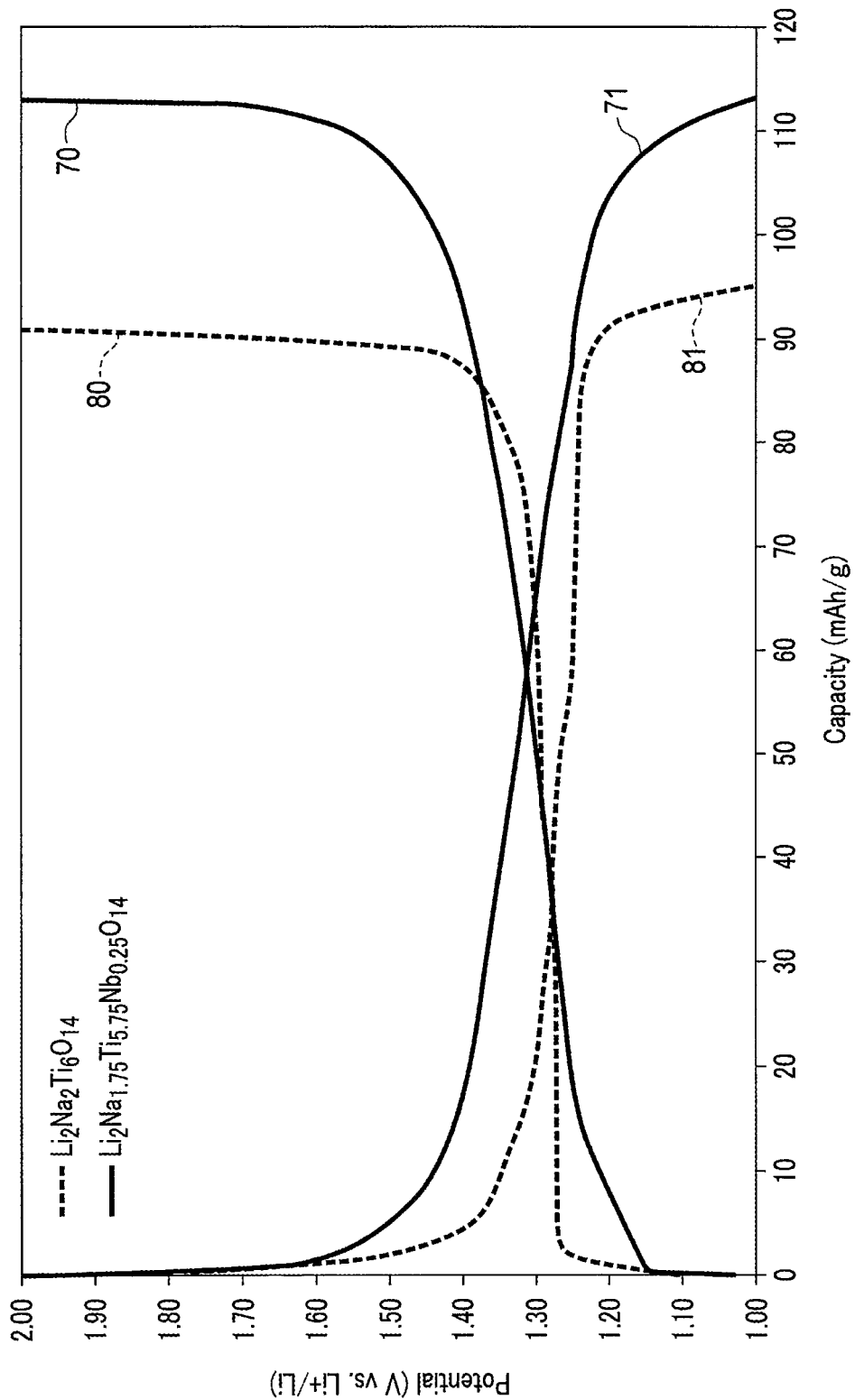
F I G. 1

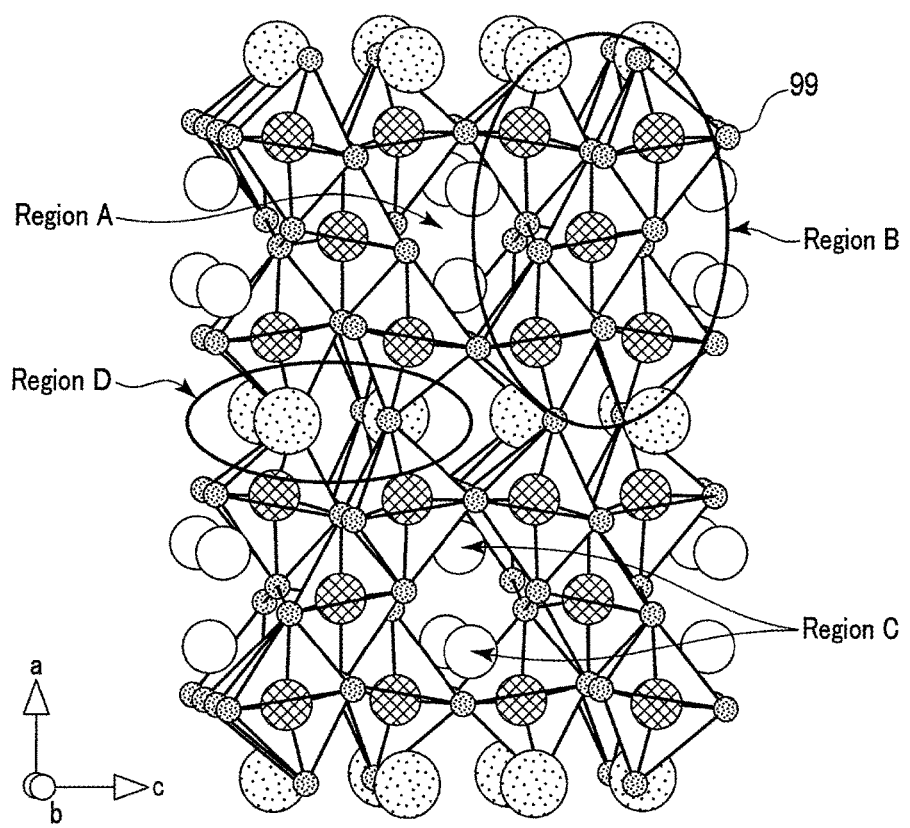
F I G. 2

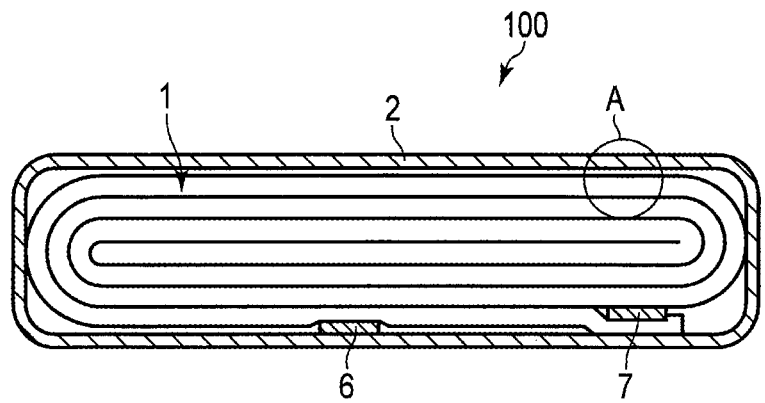
F I G. 3
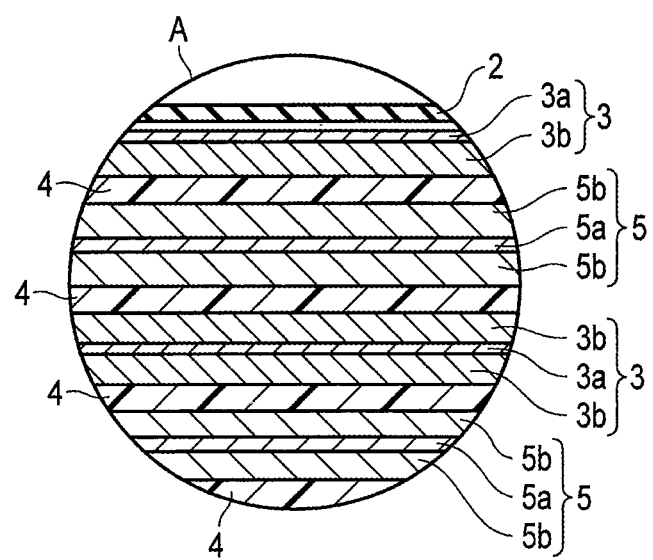
F I G. 4

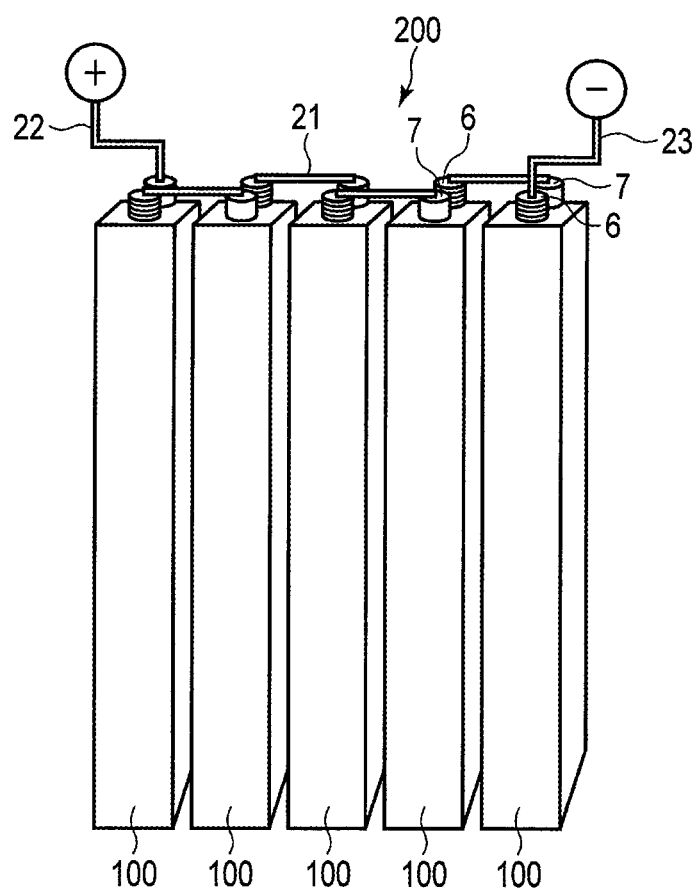
F I G. 7

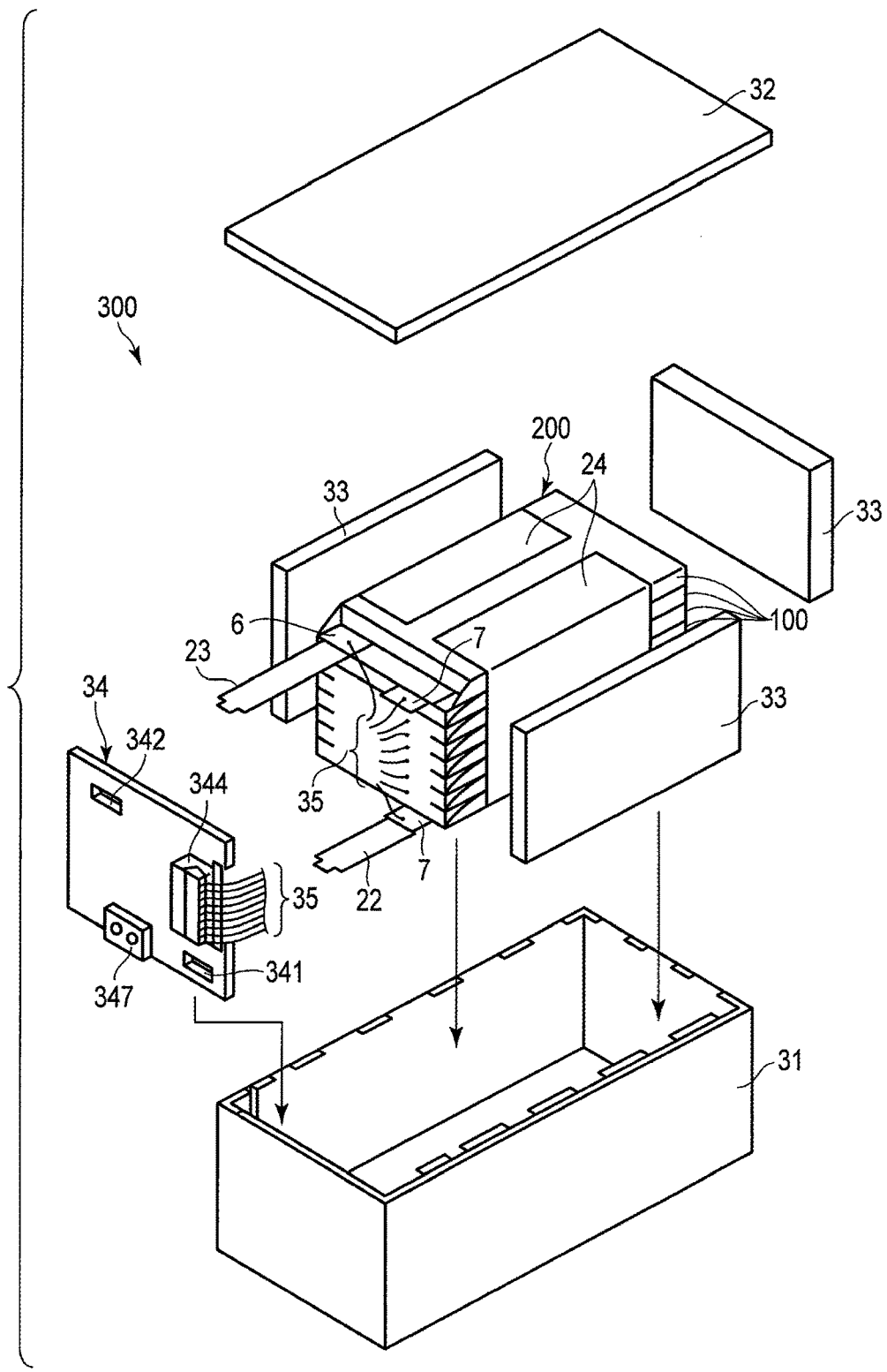
F I G. 8

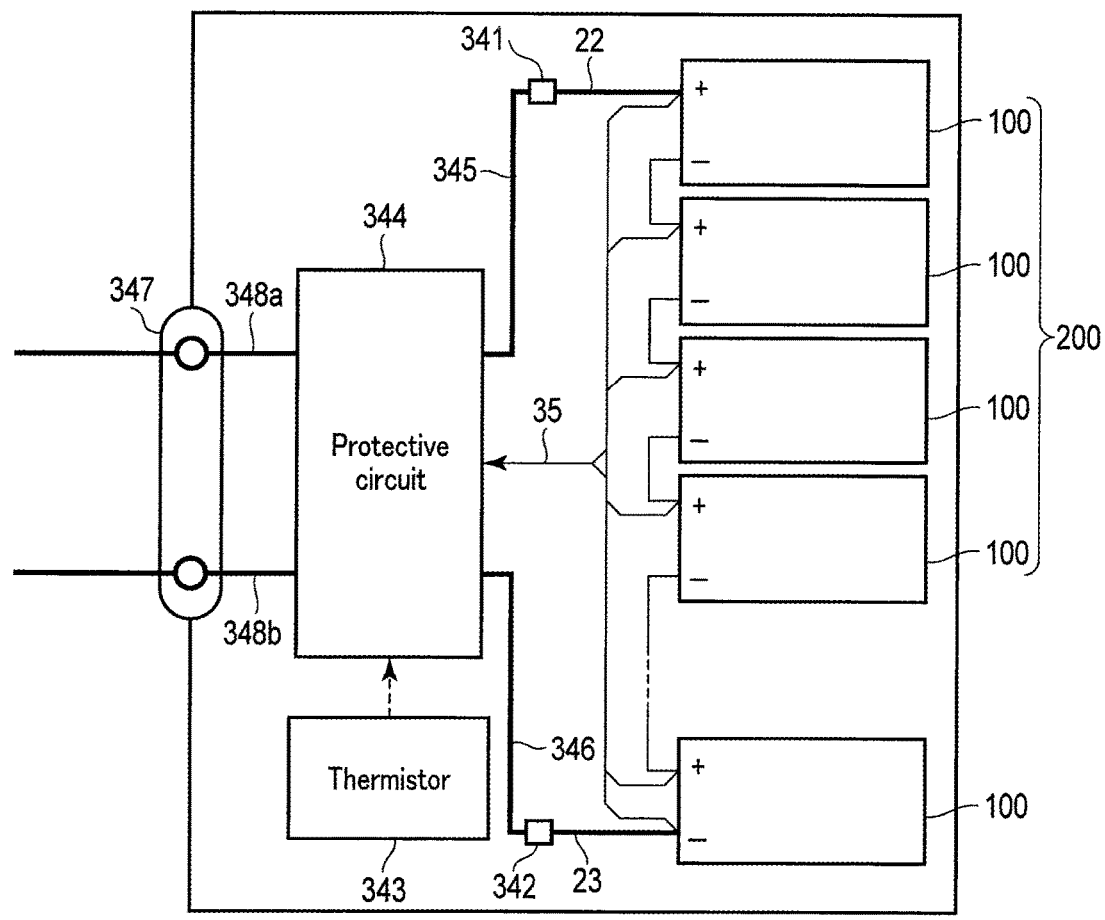
F I G. 9
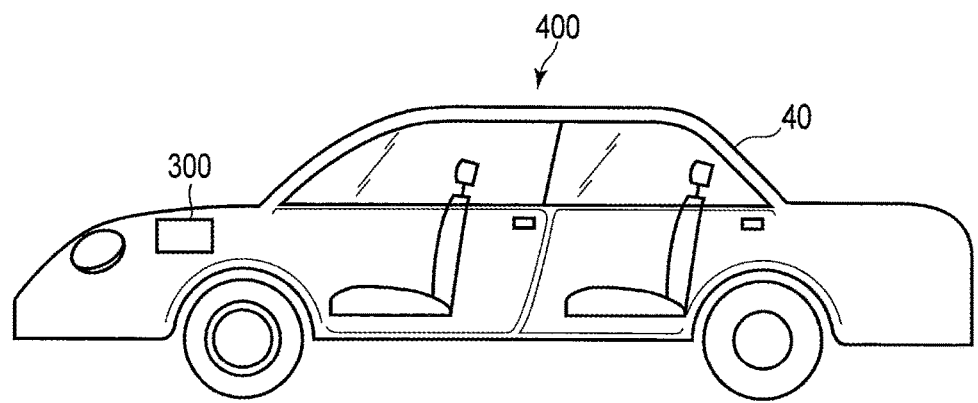
F I G. 10

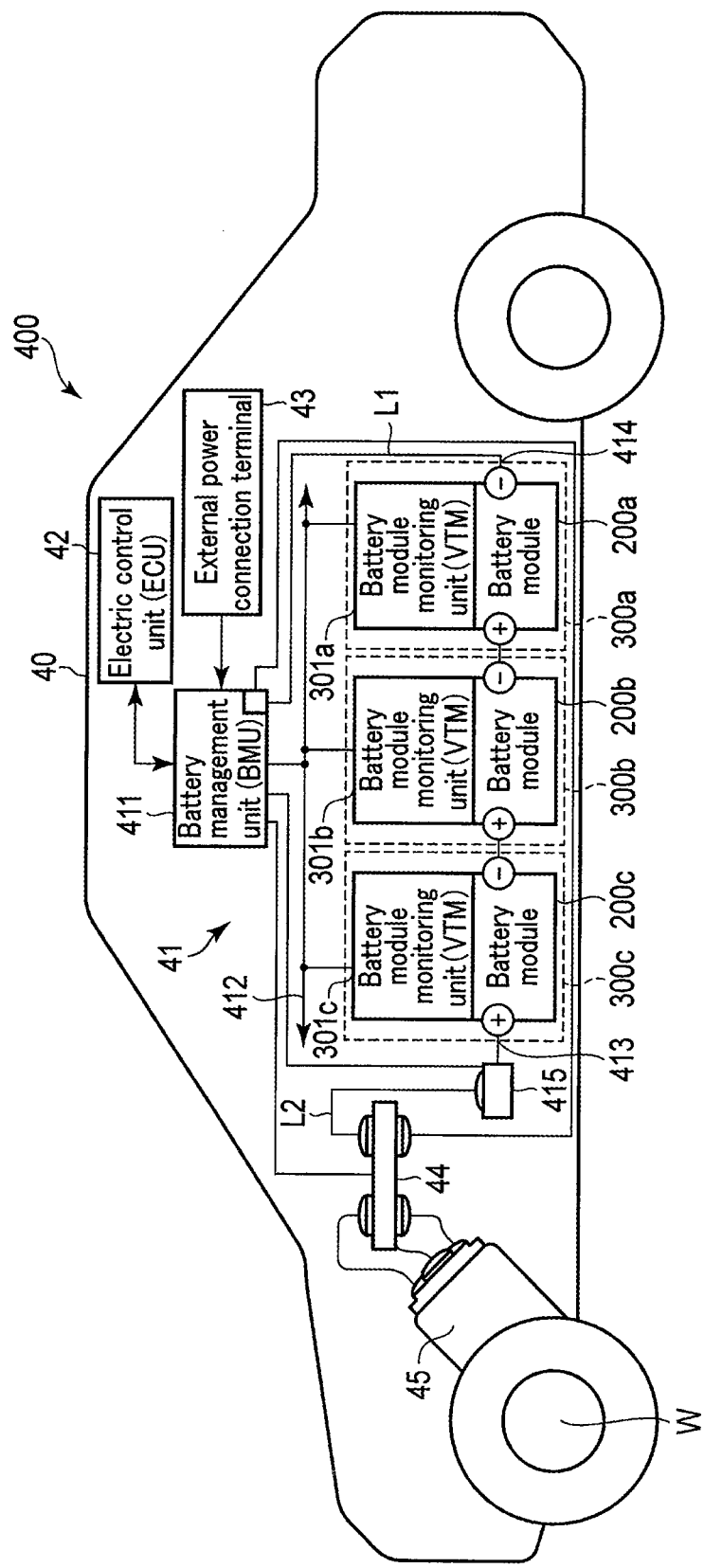
F I G. 11

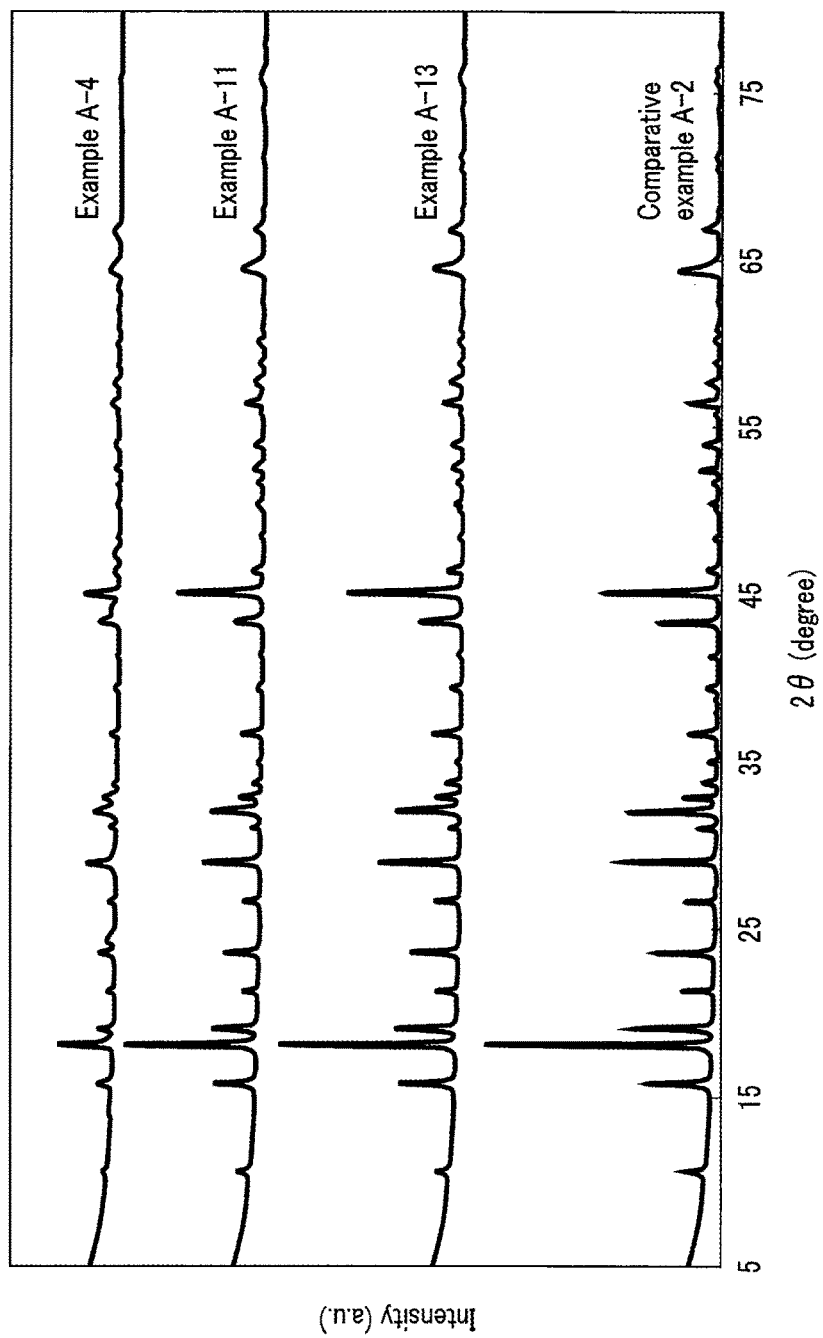
F I G. 12

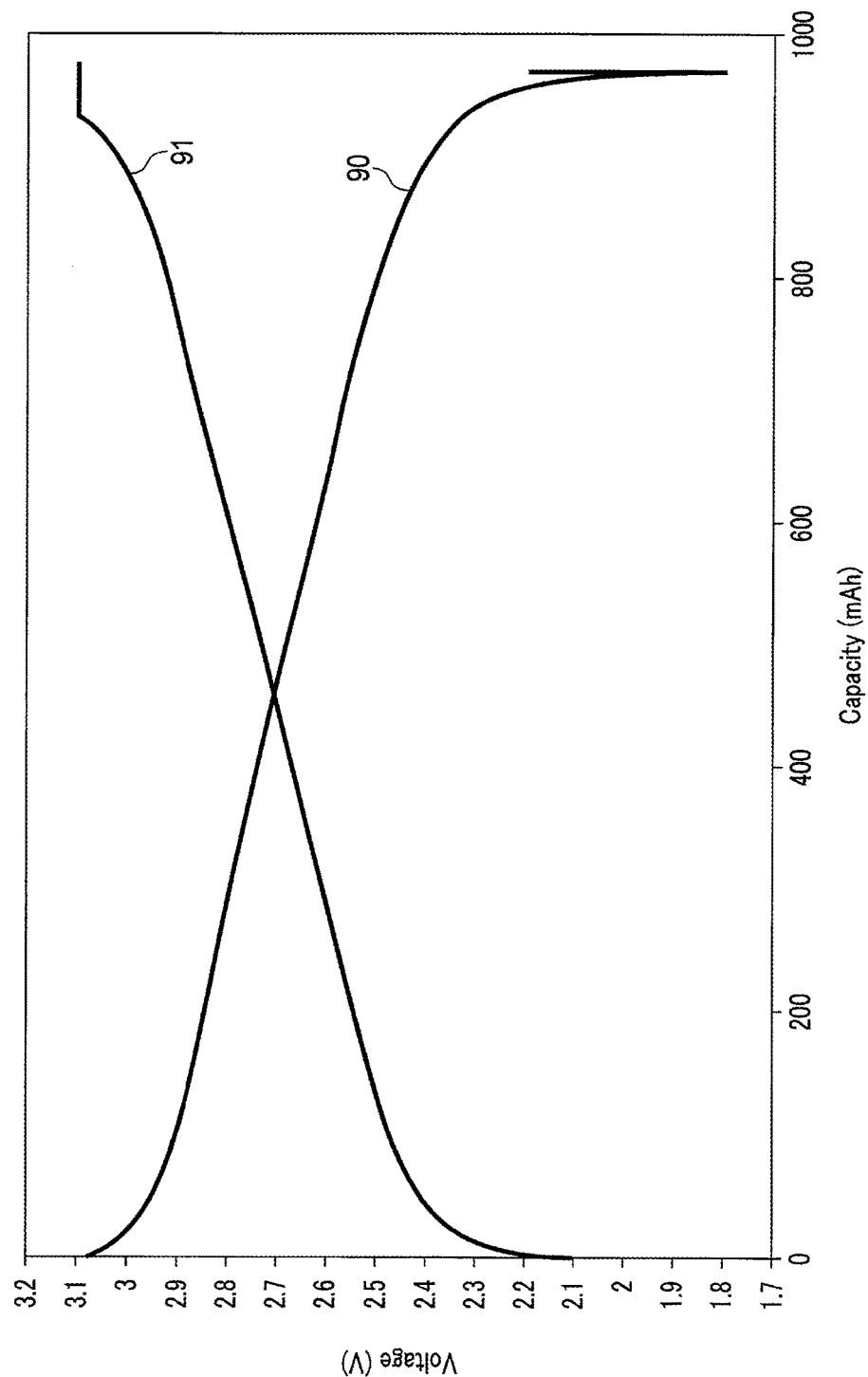
F I G. 15

ACTIVE MATERIAL, ELECTRODE, SECONDARY BATTERY, BATTERY PACK, AND VEHICLE

CROSS-REFERENCE TO RELATED APPLICATION

This application is based upon and claims the benefit of priority from the Japanese Patent Application No. 2017-058400, filed Mar. 24, 2017, the entire contents of which is incorporated herein by reference.

FIELD

Embodiments relate to an active material, an electrode, a secondary battery, a battery pack, and a vehicle.

BACKGROUND

Recently, a secondary battery such as a lithium ion secondary battery and a nonaqueous electrolyte secondary battery has been actively researched and developed as a high energy-density battery. The secondary battery is anticipated for use as a power source for hybrid vehicles, electric vehicles, an uninterruptible power supply for base stations for portable telephones, or the like. Therefore, the secondary battery is demanded to, in addition to having a high energy density, be excellent in other performances such as rapid charge-and-discharge performances and long-term reliability, as well. For example, not only is the charging time remarkably shortened in a secondary battery capable of rapid charge and discharge, but the battery is also capable of improving motive performances in hybrid automobiles, and the like, and efficient recovery of regenerative energy of motive force.

In order to enable rapid charge-and-discharge, electrons and lithium ions must be able to migrate rapidly between the positive electrode and the negative electrode. However, when a battery using a carbon-based negative electrode is repeatedly subjected to rapid charge-and-discharge, precipitation of dendrite of metallic lithium on the electrode may sometimes occur, raising concern of heat generation or ignition due to internal short circuits.

In light of this, a battery using a metal composite oxide in a negative electrode in place of a carbonaceous material has been developed. In particular, in a battery using an oxide of titanium in the negative electrode, rapid charge-and-discharge can be stably performed. Such a battery also has a longer life than in the case of using a carbon-based negative electrode.

The potential of $Li_4Ti_5O_{12}$, which is a typical titanium oxide as a negative electrode active material, is about 1.5 V (vs. $Li/Li^+$) with respect to the oxidation-reduction potential of lithium. On the other hand, the potential of a composite oxide $Li_2Na_2Ti_6O_{14}$ is as low as about 1.3 V (vs. $Li/Li^+$) on the average. Thus, a high voltage is expected when $Li_2Na_2Ti_6O_{14}$ is combined with a positive electrode. Element substitution may be performed to obtain $Li_2Na_{2-x}Ti_{6-x}M_xO_{14}$ (M=Fe, Co, Mn, Al, Zr, Sn, V, Nb, Ta, or Mo), thereby forming a vacancy at Na sites in the crystal structure. The number of Li insertion/extraction sites is thereby increased to increase the capacity of the composite oxide.

BRIEF DESCRIPTION OF THE DRAWINGS

FIG. 1 is a graph showing charge and discharge curves of a composite oxide $Li_2Na_2Ti_6O_{14}$ and charge and discharge curves of a composite oxide $Li_2Na_{1.75}Ti_{5.75}Nb_{0.25}O_{14}$;

FIG. 2 is a crystal structure diagram of $Li_2Na_{1.75}Ti_{5.75}Nb_{0.25}O_{14}$, which is one example of a composite oxide having symmetry of a space group Fmmm;

FIG. 3 is a cross-sectional view schematically showing an example of a secondary battery according to an embodiment;

FIG. 4 is an enlarged cross-sectional view of section A of the secondary battery shown in FIG. 3;

FIG. 7 is a perspective view schematically showing an example of a battery module according to an embodiment;

FIG. 8 is an exploded perspective view schematically showing an example of a battery pack according to a fourth embodiment;

FIG. 9 is a block diagram showing an example of an electric circuit of the battery pack shown in FIG. 8;

FIG. 10 is a cross-sectional view schematically showing an example of a vehicle according to an embodiment;

FIG. 11 is a diagram schematically showing another example of the vehicle according to an embodiment;

FIG. 12 is an X-ray diffraction diagram of products of Examples A-4, A-11, A-13, and Comparative Example A-2;

FIG. 15 is a graph showing a discharge curve of the nonaqueous electrolyte battery of Example E.

DETAILED DESCRIPTION

Figure 5:
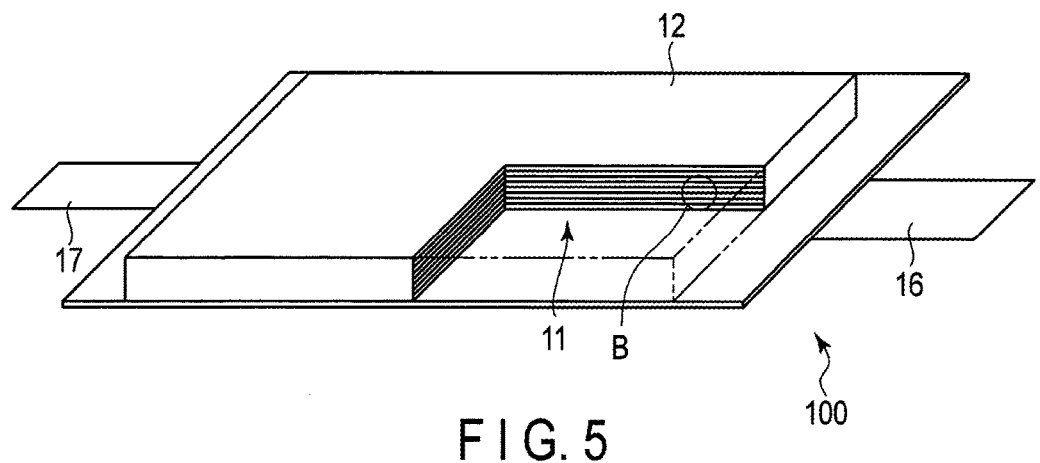
FIG. 5 is a partially cut-out perspective view schematically showing another example of the secondary battery according to an embodiment.

According to one embodiment, there is provided an active material including particles of a composite oxide having an orthorhombic crystal structure and represented by the general formula $Li_{2+w}Na_{2-x}M1_yTi_{6-z}M2_zO_{14+\delta}$. The particles of the composite oxide have an average crystallite size of 50 nm to 90 nm and an average primary particle size of 0.1 μm to 0.6 μm. M1 is at least one selected from the group consisting of Cs and K. M2 is at least one selected from the group consisting of Zr, Sn, V, Nb, Ta, Mo, W, Fe, Y, Co, Mn, and Al. w falls within $0 \leq w \leq 4$, x falls within $0 < x < 2$, y falls within $0 \leq y < 2$, z falls within $0 < z < 6$, and δ falls within $-0.5 \leq \delta \leq 0.5$.

According to another embodiment, an electrode is provided. The electrode includes the active material according to the embodiment.

According to yet another embodiment, there is provided a secondary battery including a negative electrode, a positive electrode, and an electrolyte. The negative electrode is the electrode according to the embodiment.

According to a further other embodiment, a battery pack is provided. The battery pack includes the secondary battery according to the embodiment.

According to still another embodiment, a vehicle is provided. The vehicle includes the battery pack according to the embodiment.

From the viewpoint of the crystal structure, the composite oxide $Li_2Na_{2-x}Ti_{6-x}M_xO_{14}$ has a high lithium ion diffusion resistance therein, because Li—Li diffusion distance within its tunnel structures is short. Therefore, there has been a problem of low input-output performance, particularly in a high charge state.

One measure for improvement for the low input-output performance is to set the particles of the composite oxide to have a small particle size and a large crystallite size. The large crystallite size can reduce the grain boundary and secure the lithium ion diffusion site. In addition, the reduction of the particle size can reduce the lithium ion diffusion distance in the particle. According to the conventional synthesis method, however, it has been problematic that in association with the reduction in the particle size, the crystallite size becomes reduced, leading to increase of the diffusion resistance of the lithium ions in the particle.

Embodiments will be explained below with reference to the drawings. Structures common among the embodiments are represented by the same symbols and over-lapping explanations are omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to a first embodiment, an active material including particles of a composite oxide having an orthorhombic crystal structure is provided. The composite oxide is represented by a general formula $Li_{2+w}Na_{2-x}M1_yTi_{6-z}M2_zO_{14+\delta}$. In the general formula, M1 is at least one selected from the group consisting of Cs and K. M2 is at least one selected from the group consisting of Zr, Sn, V, Nb, Ta, Mo, W, Fe, Y, Co, Mn, and Al. M1 may be one kind of element, or plural kinds of elements. M2 may be one kind of element or plural kinds of elements. w is $0 \leq w \leq 4$. x is $0 < x < 2$. y is $0 \leq y < 2$. z is $0 < z < 6$. $\delta$ is $-0.5 \leq \delta \leq 0.5$. The particles of the composite oxide have an average crystallite size of 50 nm to 90 nm and an average primary particle size of 0.1 μm to 0.6 μm.

The active material may be an active material for a battery.

The composite oxide included in the active material according to the first embodiment may be a substituted composite oxide in which, in an orthorhombic crystal structure of a composite oxide represented by the general formula $Li_{2+w}Na_2Ti_6O_{14+\delta}$, a part of Na sites is substituted by a cation M1 and/or Na is removed from a part of the Na sites to form a vacancy, and at least a part of Ti sites is substituted by a cation M2.

By virtue of the particles of the composite oxide included in the active material according to the first embodiment simultaneously establishing small particle size and high crystallite size, which are contradictory properties, high input-output properties can be obtained.

When an Na amount in the crystal structure of the composite oxide is changed, an electrode potential behavior of the composite oxide relative to the oxidation-reduction potential of lithium is changed. The active material according to the first embodiment including the composite oxide, which is represented by the general formula $Li_{2+w}Na_{2-x}M1_yTi_{6-z}M2_zO_{14-\delta}$ wherein $0 < x < 2$, can have an average potential of lithium insertion within a potential range of 1.0 V (vs. Li/Li$^+$) to 1.5 V (vs. Li/Li$^+$) relative to the oxidation-reduction potential of lithium. Thus, a secondary battery, using the active material according to the first embodiment in the negative electrode can exhibit a battery voltage higher than that of, for example, a secondary battery using a titanium composite oxide having a lithium insertion potential of 1.55 V (vs. Li/Li$^+$) in the negative electrode.

Further, among the composite oxides represented by the general formula $Li_{2+w}Na_{2-x}M1_yTi_{6-z}M2_zO_{14+\delta}$, in a composite oxide which has vacancies at portions corresponding to a part of the Na sites of the composite oxide represented by the general formula $Li_{2+w}Na_2Ti_6O_{14+\delta}$, these vacancies can serve as a further site of insertion and extraction of Li ions. Thus, in the composite oxide containing such vacancies, Li ions can be more easily inserted and extracted than in the composite oxide represented by the general formula $Li_{2+w}Na_2Ti_6O_{14+\delta}$; as a result, a higher charge-and-discharge capacity can be realized.

Regarding the composite oxide included in the active material according to the first embodiment, a correlation between a charge capacity and a battery voltage can be more easily comprehended than in the composite oxide represented by the general formula $Li_{2+w}Na_2Ti_6O_{14+\delta}$, in a potential range of 1.0 V (vs. Li/Li$^+$) to 1.45 V (vs. Li/Li$^+$). With reference to FIG. 1, explained below is the reason why the correlation between the charge capacity and the battery voltage can be more easily comprehended for the composite oxide included in the active material according to the first embodiment.

FIG. 1 shows charge and discharge curves (charge curve 81, discharge curve 80) of a composite oxide $Li_2Na_2Ti_6O_{14}$, and charge and discharge curves (charge curve 71, discharge curve 70) of a composite oxide $Li_2Na_{1.75}Ti_{5.75}Nb_{0.25}O_{14}$. The composite oxide $Li_2Na_{1.75}Ti_{5.75}Nb_{0.25}O_{14}$, whose potential change is shown by solid lines, has an orthorhombic crystal structure, and has a composition and crystal structure corresponding to a composite oxide which may be included in the active material according to the first embodiment. On the other hand, the composite oxide $Li_2Na_2Ti_6O_{14}$, whose potential change is shown by broken lines, is a composite oxide represented by the general formula $Li_{2+w}Na_2Ti_6O_{14+\delta}$ and having an orthorhombic crystal structure. The composite oxide $Li_2Na_{1.75}Ti_{5.75}Nb_{0.25}O_{14}$ may be a substituted oxide in which Na is removed from a part of the Na sites of the crystal structure of the composite oxide $Li_2Na_2Ti_6O_{14}$ to form vacancies, and a part of the Ti sites thereof is substituted by Nb.

As shown by the broken lines in FIG. 1, each of the charge curve 81 and the discharge curve 80 of the composite oxide $Li_2Na_2Ti_6O_{14}$ includes as majority excluding the beginning and end periods of charge and discharge, a flat portion, in which a variation in potential accompanying change in capacity is small. For example, from the charge curve 81 towards Li insertion, it can be seen that when the composite oxide $Li_2Na_2Ti_6O_{14}$ is subjected to charge from a potential of 1.35 V (vs. Li/Li$^+$) to a potential of 1.20 V (vs. Li/Li$^+$), about 80 mAh/g is charged in this small potential difference of 0.15 V. This charge capacity corresponds to about 90% of the total charge capacity of the composite oxide $Li_2Na_2Ti_6O_{14}$. Similarly, from the discharge curve 80 towards Li extraction, it can be seen that when the composite oxide $Li_2Na_2Ti_6O_{14}$ is subjected to discharge from a potential of 1.20 V (vs. Li/Li$^+$) to a potential of 1.35 V (vs. Li/Li$^+$), about 90% of the total discharge capacity is discharged in this small potential difference potential of 0.15 V. Thus, the charge curve and the discharge curve of the composite oxide $Li_2Na_2Ti_6O_{14}$ hardly show change in potential accompanying the changes of the charged capacity and the discharged capacity. That is, each of the charge and discharge curves of the composite oxide $Li_2Na_2Ti_6O_{14}$ includes as majority, the region in which the potential gradient is small. In a non-aqueous electrolyte battery produced using the composite oxide having such a potential change in a negative electrode, the correlation between the charge capacity and the battery voltage is difficult to comprehend, and thus, difficult to manage the state of charge (SOC) during charge and discharge.

On the other hand, as shown by the solid lines in FIG. 1, it is found that each of a charge curve 71 and a discharge curve 70 of the composite oxide $Li_2Na_{1.75}Ti_{5.75}Nb_{0.25}O_{14}$ has, as majority excluding the beginning and end periods of charge and discharge, a portion in which a variation in potential accompanying change in capacity is large. Specifically, from the charge curve 71 towards Li insertion, it can be seen that when starting from a potential of 1.50 V (vs. Li/Li$^+$) and 90% of the total capacity is charged, the potential of the composite oxide $Li_2Na_{1.75}Ti_{5.75}Nb_{0.25}O_{14}$ becomes about 1.15 V (vs. Li/Li$^+$). Namely, the composite oxide $Li_2Na_{1.75}Ti_{5.75}Nb_{0.25}O_{14}$ exhibits a variation in potential of about 0.35 V during the charge. Similarly, from the discharge curve 70 towards Li extraction, it can be seen that when starting from a potential of 1.15 V (vs. Li/Li$^+$) and 90% of the total capacity is discharged, the capacity of the composite oxide $Li_2Na_{1.75}Ti_{5.75}Nb_{0.25}O_{14}$ becomes about 1.50 V (vs. Li/Li$^+$), thus, there being a variation in potential of about 0.35 V during the discharge. Thus, each of the charge and discharge curves of the composite oxide $Li_2Na_{1.75}Ti_{5.75}Nb_{0.25}O_{14}$ includes, as majority, a portion in which a variation in potential accompanying change in capacity is larger than that in the potential flat portion included in the charge and discharge curves of the composite oxide $Li_2Na_2Ti_6O_{14}$, i.e., a portion having a larger gradient than the potential flat portion.

In addition, as shown by the solid line in FIG. 1, the charge and discharge curves of the composite oxide $Li_2Na_{1.75}Ti_{5.75}Nb_{0.25}O_{14}$ exhibits, at portions other than the beginning and end periods, a continuous potential change which does not include a potential stepwise section in which the potential steeply changes during the charge and discharge.

For a secondary battery produced using, in the negative electrode, the composite oxide exhibiting the potential change as described above, the correlation between the charged and discharged capacities and the battery voltage is easy to comprehend and thus management of the SOC of the battery is easy.

Furthermore, as apparent from the charge and discharge curves shown in FIG. 1, the composite oxide $Li_2Na_2Ti_6O_{14}$ exhibits a charge-and-discharge capacity of about 90 mAh/g. On the other hand, the composite oxide $Li_2Na_{1.75}Ti_{5.75}Nb_{0.25}O_{14}$ exhibits a charge-and-discharge capacity of 115.9 mAh/g, and thus able to exhibit a charge-and-discharge capacity which is higher than that of the composite oxide $Li_2Na_2Ti_6O_{14}$.

The composite oxide that may be included in the active material according to the first embodiment can exhibit a continuous potential change which does not include a potential stepwise section within the potential range of 1.0 V to 1.45 V (vs. Li/Li$^+$) because of being able to have uniform insertion sites of lithium. The reason for this will be described below.

The composite oxide, which may be included in the active material according to the first embodiment, has a composition represented by the general formula $Li_{2+w}Na_{2-x}M1_yTi_{6-z}M2_zO_{14+\delta}$. In this composite oxide, Li exists as a monovalent cation. M1 is at least one monovalent cation selected from the group consisting of Cs and K. M1 may be one of Cs and K, or both of Cs and K. M2 is at least one cation selected from the group consisting of Zr, Sn, V, Nb, Ta, Mo, W, Fe, Co, Y, Mn and Al. M2 may be one cation selected from the group consisting of Zr, Sn, V, Nb, Ta, Mo, W, Fe, Co, Y, Mn and Al, or be two or more cations selected from the group consisting of Zr, Sn, V, Nb, Ta, Mo, W, Fe, Co, Y, Mn and Al. Here, each of Fe, Co, Y, Mn and Al is a trivalent cation. Each of Zr and Sn is a tetravalent cation. Each of V, Nb and Ta is a pentavalent cation. Each of Mo and W is a hexavalent cation. Here, the valence of each cation described above are a valence of each cation when w is 0 in the above general formula, i.e., in a discharged state.

In this composite oxide, the total valence of the cations coincides with the total valence of oxide ions which are anions, and thus the charge neutrality can be maintained. Specifically, in this composite oxide, the total valence of the lithium ions is 2+w. The total valence of the sodium ions is 2−x. The total valence of the M1 is y. The total valence of Ti is 4×(6−z). Assuming that one mole of the composite oxide contains $z_3$ mole of the trivalent cation $M2_3$, $z_4$ mole of the tetravalent cation $M2_4$, $z_5$ mole of the pentavalent cation $M2_5$, and $z_6$ mole of the hexavalent cation $M2_6$, where $z_3+z_4+z_5+z_6=z$, the total valence of the M2 is $(z_3\times3)+(z_4\times4)+(z_5\times5)+(z_6\times6)$. The total valence of these cations coincides with the total valence of oxide ions which are anions: $(-2)\times(14+\delta)$.

The state in which the total valence of the cations coincides with the total valence of the oxide ions is represented by the following equation (1):

$$(2+w)+(2-x)+y+\{4\times(6-z)\}+\{(z_3\times3)+(z_4\times4)+(z_5\times5)+(z_6\times6)\}-2\times(14+\delta)=0 \quad (1)$$

Equation (1) can be reorganized into the following equation (2):

$$w-x+y-4z+(3z_3+4z_4+5z_5+6z_6)=2\delta \quad (2)$$

The charge neutrality in the crystal structure of the composite oxide can be maintained by satisfying the conditions of the equation (2). The composite oxide $Li_{2+w}Na_{2-x}M1_yTi_{6-z}M2_zO_{14+\delta}$ whose charge neutrality is maintained may be a substituted oxide in which a part of the Ti sites is properly substituted by the cation M2 in the crystal structure of the composite oxide represented by the general formula $Li_{2+w}Na_2Ti_6O_{14+\delta}$. In addition, the composite oxide $Li_{2+w}Na_{2-x}M1_yTi_{6-z}M2_zO_{14+\delta}$ in which charge neutrality is maintained and y is greater than 0 may be a substituted oxide in which a part of the Na sites is properly substituted by the cation M1 in the crystal structure of the composite oxide represented by the general formula $Li_{2+w}Na_2Ti_6O_{14+\delta}$.

In addition, in the composite oxide $Li_{2+w}Na_{2-x}M1_yTi_{6-z}M2_zO_{14+\delta}$ whose charge neutrality is maintained, a portion corresponding to a part of the Na sites in the crystal structure of the composite oxide represented by the general formula $Li_{2+w}Na_2Ti_6O_{14+\delta}$ can stably exist as a vacancy in the crystal structure. By including the substituted oxide in which the cation M2 is properly substituted in the crystal structure of the composite oxide represented by the general formula $Li_{2+w}Na_2Ti_6O_{14+\delta}$ and which contains the properly substituted cation M1 and/or the vacancy which can stably exist in the crystal structure of the composite oxide, as such, a coordination environment of the oxide ions in relation to vacancy sites where the lithium ions are inserted can be made uniform in the active material according to the first embodiment. This is a reason why the composite oxide, which may be included in the active material according to the first embodiment, can show a continuous potential change within a potential range of 1.0 V to 1.45 V (vs.

Li/Li$^+$). On the other hand, for a composite oxide where uniformity of the coordination environment of the oxide ions in relation to the vacancy sites is low, there are exhibited potential stepwise portions in the charge and discharge curves, i.e., portions with a steep change in the potential.

In addition, by including the composite oxide corresponding to a substituted oxide in which the cation M2 is properly substituted in the crystal structure of the composite oxide represented by the general formula Li$_{2+w}$Na$_2$Ti$_6$O$_{14+\delta}$ and which includes in the crystal structure of the composite oxide represented by the general formula Li$_{2+w}$Na$_2$Ti$_6$O$_{14+\delta}$, the properly substituted cation M1 and/or the vacancies which can stably exist, the active material according to the first embodiment can provide a secondary battery capable of exhibiting high reversible capacity in the charge and discharge and excellent life performance. In particular, the substituted oxide in which a part of the Na sites in the composite oxide Li$_{2+w}$Na$_2$Ti$_6$O$_{14+\delta}$ is substituted by the stably existing vacancies can realize higher reversible capacity, because electrical charge repulsion is reduced at sites that can serve as host for Li ions.

Here, the subscript of the oxide ion $\delta$ can have a value within a range of −0.5 to 0.5, and thus the same effects can be obtained even if the total valence of the cations described above varies within a range of ±1 relative to a valence of −28, which is the total valence of the oxide ions. If $\delta$ deviates beyond the range of −0.5≤$\delta$≤0.5, there is a possibility that the oxidation-reduction state of the cations is deviated from a stable state, or a lattice defects such as an oxygen deficiency has occurred, thus undesirably resulting in reduced battery performance.

Assuming that the cations forming the composite oxide are in a stable oxidation state, and oxide ions exist in a proper quantity, $\delta$=0 would hold, and thus the total valence of the oxide ions is −2×14=−28. In this case, the state in which the total valence of the cations coincides with the total valence of the oxide ions is represented by the following equation (3):

$$(2+w)+(2-x)+y+\{4\times(6-z)+\{(z_3\times3)+(z_4\times4)+(z_5\times5)+(z_6\times6)\}-28=0 \quad (3)$$

Equation (3) can be reorganized into the following equation (4):

$$w-x+y-4z+(3z_3+4z_4+5z_5+6z_6)=0 \quad (4)$$

Resultantly, the active material according to the first embodiment can realize a secondary battery which can exhibit high energy density and high battery voltage, is excellent in life performance, able to exhibit high input-output performance, and where voltage management is easy.

The subscript w in the general formula Li$_{2+w}$Na$_{2-x}$M1$_y$Ti$_{6-z}$M2$_z$O$_{14+\delta}$ for the composite oxide can vary within 0≤w≤4 depending on the state of charge of the composite oxide. For example, according to a production method described below, a composite oxide in which the subscript w is 0 in the above general formula can be produced. When the composite oxide in which the subscript w is 0 is incorporated into a battery as the negative electrode active material, and the resulting battery is charged, the value of w+2 is elevated to a value of more than 2 and 6 or less. Alternatively, a composite oxide can also be synthesized with a raw material composition ratio where an Li amount in the formula, w+2, would be more than 2 and 6 or less before initial charge, for example, by the process described later. The active material including the composite oxide having an Li amount, w+2 of a value greater than 2 and equal to or less than 6 before initial charge can suppress the trapping of lithium ions in its structure during the initial charge and discharge, and as a result, the initial charge-and-discharge efficiency can be improved.

The subscript x in the general formula Li$_{2+w}$Na$_{2-x}$M1$_y$Ti$_{6-z}$M2$_z$O$_{14+\delta}$ for the composite oxide indicates an Na amount in the crystal structure of this composite oxide. With the active material according to the first embodiment, by changing the Na amount in the crystal structure, i.e., changing the value of the subscript x, an average operating potential of an electrode including this active material can be adjusted within a potential range of 1.0 V (vs. Li/Li$^+$) to 1.5 V (vs. Li/Li$^+$) relative to the oxidation-reduction potential of lithium. Thereby, designing the operating voltage of the battery becomes easy. From a different perspective, the subscript x is an index indicating a proportion of a part which is substituted by the cation M1 or the vacancy in the substituted composite oxide, among the sites corresponding to the Na sites in the composite oxide Li$_{2+w}$Na$_2$Ti$_6$O$_{14+\delta}$. The subscript x falls within 0<x<2, preferably within 0.1≤x≤0.9, and more preferably within 0.25≤x≤0.75.

The subscript y in the general formula Li$_{2+w}$Na$_{2-x}$M1$_y$Ti$_{6-z}$M2$_z$O$_{14+\delta}$ indicates an amount of cation M1 included in the crystal structure of the composite oxide represented by this general formula. In addition, the cation M1 is one with which a part of the Na sites in the composite oxide Li$_{2+w}$Na$_2$Ti$_6$O$_{14+\delta}$ is substituted. Accordingly, the combination of the subscript x and the subscript y is an index indicating a proportion of a part which is substituted by the cation M1 in the substituted composite oxide, among the sites corresponding to the Na sites in the composite oxide Li$_{2+w}$Na$_2$Ti$_6$O$_{14+\delta}$. The value of the subscript y is, accordingly, a value equal to or less than the value of the subscript x.

The subscript y falls within 0≤y<2. Therefore, the value of the subscript y may be 0. That is, the composite oxide, represented by the general formula Li$_{2+w}$Na$_{2-x}$M1$_y$Ti$_{6-z}$M2$_z$O$_{14+\delta}$, may include no cation M1. When the value of the subscript y is 0, the composite oxide included in the active material according to the first embodiment, is represented by the general formula Li$_{2+w}$Na$_{2-x}$Ti$_{6-z}$M2$_z$O$_{14+\delta}$. In this composite oxide, a part corresponding to a part of the Na sites in the composite oxide Li$_{2+w}$Na$_2$Ti$_6$O$_{14+\delta}$, i.e., a part of the proportion represented by the subscript x is vacancy.

When Na ions are removed from a part of the Na sites in the composite oxide Li$_{2+w}$Na$_2$Ti$_6$O$_{14+\delta}$ to form vacancies, the total valence of the cations in the composite oxide is decreased. Specifically, when x moles of Na ions are removed from one mole of the composite oxide Li$_{2+w}$Na$_2$Ti$_6$O$_{14+\delta}$ to form x moles of vacancies, the total valence of the cations in this composite oxide is decreased by x. In such a case, the charge neutrality can be maintained, for example, by inserting Li ions into the formed vacancies or by substituting a part of Ti sites in the composite oxide Li$_{2+w}$Na$_2$Ti$_6$O$_{14+\delta}$ by the pentavalent M2$_5$ or the hexavalent M2$_6$ as the cation M2, so as to compensate for the decreased valences x. Such a substitution can decrease Na ions, which impair lithium ion conduction, and increase vacancies that serve as host sites of Li ions, while the crystal structure of the composite oxide Li$_{2+w}$Na$_2$Ti$_6$O$_{14+\delta}$ is maintained. Thus, the substituted composite oxide capable of realizing the enhanced charge-and-discharge capacity can be obtained.

The subscript y preferably falls within 0≤y≤1, and more preferably is 0.

The subscript z in the general formula Li$_{2+w}$Na$_{2-x}$M1$_y$Ti$_{6-z}$M2$_z$O$_{14+\delta}$ for the composite oxide indicates an amount of the cation M2 included in the crystal structure of the composite oxide represented by this general formula. In addition, the cation M2 is one with which a part of the Ti sites in the composite oxide $Li_{2+w}Na_2Ti_6O_{14+\delta}$ is substituted. Therefore, the subscript z is an index showing a proportion of a part which is substituted by the cation M2 in the substituted composite oxide, among the sites corresponding to the Ti sites in the composite oxide $Li_{2+w}Na_2Ti_6O_{14+\delta}$. The subscript z falls within 0<z<6, preferably within 0.1≤z≤0.9, more preferably within 0.25≤z≤0.75.

The subscript δ in the general formula $Li_{2+w}Na_{2-x}M1_yTi_{6-z}M2_zO_{14+\delta}$ for the composite oxide may vary within a range of −0.5≤δ≤0.5 depending on the oxygen deficiency of the composite oxide represented by this general formula or the amount of oxygen inevitably incorporated during the production process of the active material.

Although each of the subscripts w, x, y, z and δ can be a value within the specific range as described above, in the composite oxide represented by the general formula $Li_{2+w}Na_{2-x}M1_yTi_{6-z}M2_zO_{14+\delta}$, the total valence of the cations is equal to the total valence of the anions, as described above.

In an X-ray diffraction diagram for the composite oxide represented by the general formula $Li_{2+w}Na_{2-x}M1_yTi_{6-z}M2_zO_{14+\delta}$ obtained by a powder X-ray diffraction using Cu-Kα rays, it is preferable that an intensity ratio $I_L/I_H$ falls within 2.25≤$I_L/I_H$≤3.50, wherein $I_L$ is an intensity of a strongest diffraction peak appearing in a range of 17°≤2θ≤18.5°, and $I_H$ is an intensity of a strongest diffraction peak appearing in a range of 18.5°<2θ≤19.5°.

A composite oxide according to another example of the preferable aspects in which the intensity ratio $I_L/I_H$ falls within 2.25 I≤$_L/I_H$≤3.5 in an X-ray diffraction diagram of the composite oxide, obtained according to a powder X-ray diffraction method, is a composite oxide having an orthorhombic crystal structure belonging to a space group Fmmm. In such a composite oxide, in the X-ray diffraction diagram of the composite oxide obtained by powder X-ray diffraction using Cu-Kα rays, an intensity ratio $I_{L1}/I_{H1}$ falls within 2.25≤$I_{L1}/I_{H1}$≤3.5, wherein $I_{L1}$ is an intensity of a diffraction peak corresponding to a (111) plane, and $I_{H1}$ is an intensity of a diffraction peak corresponding to a (202) plane.

FIG. 2 is a crystal structure view of $Li_2Na_{1.5}Ti_{5.5}Nb_{0.5}O_{14}$, which is one example of the composite oxide having the symmetry of the space group Fmmm.

In the crystal structure shown in FIG. 2, the smallest spheres 99 indicate positions of oxide ions.

In the crystal structure shown in FIG. 2, a region A indicates a vacancy site having a channel in which the lithium ion can three-dimensionally move in the crystal structure, and lithium ions can be inserted into and extracted from this region A. A region B has a polyhedral structure of oxide centering on Ti or Nb, serving as the backbone of the crystal structure. On the other hand, a region C is a site in which exist lithium ions that can be absorbed and released. A region D is a site at which exist Na and Li that function as a backbone for stabilizing the crystal structure, and vacancies.

In the X-ray diffraction diagram of the composite oxide of this example measured by powder X-ray diffraction using Cu-Kα rays, an intensity ratio $I_{L1}/I_{H1}$ falls within 2.25≤$I_{L1}/I_{H1}$≤3.5. Here, $I_{L1}$ is an intensity of a diffraction peak corresponding to a (111) plane, appearing in a range of 17.8°≤2θ≤18.5°, and $I_{H1}$ is an intensity of a diffraction peak corresponding to a (202) plane, appearing in a range of 18.6°<2θ≤19.5°.

In such a composite oxide, crystallites have grown in a direction preferable for insertion and extraction of lithium ions. Furthermore, the composite oxide can suppress the insertion of lithium ions into vacancy sites where the coordination environments of the oxide ions are different from each other. Such an insertion of lithium ions is a cause for charge and discharge curves having a stepwise form. In the active material including the composite oxide of this example, accordingly, the appearance of the potential stepwise portion on the charge and discharge curves can be suppressed, and the reversibility of the lithium ions is improved during the charge and discharge. Therefore, the effective capacity can be increased, and the life performance of the secondary battery can be improved, which is preferable.

Even if the active material according to the first embodiment includes a composite oxide having a crystal structure in which a crystal phase having a symmetry other than the Fmmm symmetry is mixed, or includes a composite oxide having a crystal structure similar to the Fmmm symmetry, the same effects can be obtained as those obtained in the aspect including the composite oxide having the symmetry of the space group Fmmm. Specific examples of the symmetry similar to the Fmmm symmetry may include, Cmca, F222, Cmcm, Pmma, Cmma, and the like. The type of symmetry of a space group may be one or more than one.

In the composite oxide having the crystal structure having each of the symmetries described above, regardless of the crystal plane indices, an intensity ratio $I_L/I_H$ preferably falls within 2.25≤$I_L/I_H$≤3.5, wherein $I_L$ is an intensity of a strongest diffraction peak appearing in a range of 17°≤2θ≤18.5°, and $I_H$ is an intensity of a strongest diffraction peak appearing in a range of 18.5°<2θ≤19.5°. In such a case, not only are the charge and discharge curves smooth, but also, the reversibility of the lithium ion is improved in the charge and discharge, whereby the effective capacity is increased, and the life performance of the secondary battery can be improved.

In one preferable aspect, the active material according to the first embodiment includes the composite oxide represented by the general formula $Li_{2+w}Na_{2-x}Ti_{6-z}M2_zO_{14+\delta}$. In the formula, M2 is at least one selected from the group consisting of Zr, Sn, V, Nb, Ta, Mo, W, Fe, Co, Mn, and Al; w falls within 0≤w≤4; x falls within 0<x<2; z falls within 0<z<6; and δ falls within −0.5≤δ≤0.5.

In the orthorhombic crystal structure of the composite oxide represented by the general formula $Li_{2+w}Na_2Ti_6O_{14}$, a part of the Na sites may be diminished to form vacancy sites, which serve as hosts for the Li ions. Thereby, the energy density per unit weight or unit volume can be increased while maintaining a lattice volume capable of easily inserting and extracting lithium ions. In addition, by changing the Na amount, the average operating potential of the electrode can be changed. Thereby, designing the battery voltage is easy.

Furthermore, in a more preferable aspect among these aspects, cation M2 is Nb. In the more preferable aspect, accordingly, the composite oxide included in the active material according to the first embodiment is represented by the general formula $Li_{2+w}Na_{2-x}Ti_{6-z}Nb_zO_{14+\delta}$. Nb can undergo a divalent reduction from pentavalent Nb to trivalent Nb, and therefore, by substituting with Nb at least a part of Ti, which can undergo a monovalent reduction from tetravalent Ti to trivalent Ti, while on the other hand, vacancy sites are formed at the Na sites, the lithium insertion amount of the composite oxide can be increased. Furthermore, when Nb is included in the crystal structure, a potential relative to the oxidation-reduction potential of lithium during the insertion of Li changes continuously in a wide range of 1.5 V to 1.0 V (vs. Li/Li$^+$). When at least a part of Ti is substituted into Nb, therefore, not only is the charge-and-discharge capacity increased but also a portion can be included in the charge and discharge curves, where the variation in the potential accompanying change in capacity is larger. In the composite oxide, which can exhibit such charge and discharge curves, the charge and discharge potentials can be easily correlated with the state of charge (SOC), and thus, the state of charge (SOC) management of the battery or the like is easy.

In another preferable aspect, a composite oxide included in the active material according to the first embodiment includes two or more elements of different valences at sites corresponding to the Ti sites in the composite oxide $Li_{2+w}Na_2Ti_6O_{14+\delta}$. Such a composite oxide has a larger potential gradient during charge and discharge, and therefore is preferable. The reason why the potential gradient is larger is, for example, when there exist at sites corresponding to titanium sites in the crystal structure of the composite oxide $Li_{2+w}Na_2Ti_6O_{14+\delta}$, two or more elements that differ from each other in electrical correlations with the oxide ion, at these sites are generated multiple sites that differ from each other in electrical correlation with the Li ion and with the oxide ion, respectively. More specifically, an element having a higher valence included in these sites has a tendency to draw more of an electron cloud of the oxide ion, and on the other hand, an element having a lower valence has a tendency in which the correlation with the oxide ion and the electron cloud is weak. Therefore, a difference occurs in an electrical state of the oxide ion near the lithium host site, and as a result, the electrical correlation that the lithium ion receives from the lithium host site also becomes different. As such, the variation in the potential accompanying insertion and extraction of lithium ions increases.

A composite oxide included in an active material according to the first embodiment may take a particulate form. The average primary particle size of the composite oxide included in the active material according to the first embodiment is 0.1 µm to 0.6 µm. The average crystallite size of the composite oxide is 50 nm to 90 nm.

When the average primary particle size of the composite oxide particles is 0.6 µm or less, the lithium ion diffusion distance in the active material is reduced to improve the input-output performance (rate performance) of the battery. When the average primary particle size is 0.1 µm or more, side reactions between the active material and the electrolyte can be suppressed to obtain a battery excellent in life performance. That is, by including such composite oxide particles, the in-solid diffusion distance of lithium ions in the active material particles can be reduced to improve the input-output performance. In addition, the average primary particle size is more preferably 0.3 µm to 0.6 µm. In this case, the side reactions between the active material and the electrolyte can be further suppressed, and the life performance can be further improved.

When the average primary particle size of the composite oxide is 0.1 µm to 0.6 µm while the average crystallite size is 50 nm to 90 nm, the influence of the grain boundary and distortion in primary particles is sufficiently small, and the in-solid diffusion resistance of the lithium ions in the active material particles is reduced to improve the input-output performance. The average crystallite size is more preferably 60 nm to 90 nm. In this case, the influence of the grain boundary and distortion can be further suppressed, and the input-output performance can be further improved.

When the value of the average crystallite size of the composite oxide is ⅓ or more relative to the value of the average primary particle size, the grain boundary and distortion in the active material are reduced to facilitate the lithium ion diffusion within the active material. It is preferable that the value of the average crystallite size and the value of the average primary particle size satisfy such a relationship, since the battery output is further improved. Note that the value of the average crystallite size and the value of the average primary particle size is not particularly limited, as long as the units are the same with each other. For example, both of the average crystallite size and the average primary particle size may be expressed in units of nm to be used to calculate a numerical ratio. Alternatively, for example, both the average crystallite size and the average primary particle size may be expressed in units of µm to be used to calculate a numerical ratio.

It is preferable that the active material according to the first embodiment includes the composite oxide particles described above, and an electro-conductive substance such as carbon covering the surface of the particles. The active material according to such a preferable aspect can exhibit an improved rapid-charge-and-discharge performance. In the composite oxide described above, lithium is inserted and extracted via a homogeneous solid state reaction, and thus the composite oxide has a nature in which the electrical conductivity increases as the lithium insertion amount increases. In such a composite oxide, the electrical conductivity is relatively low in a region where the lithium insertion amount is small. When the surface of the composite oxide particle is covered in advance with a conductive substance such as carbon, accordingly, the high rapid-charge-and-discharge performance can be obtained regardless of the lithium insertion amount.

Alternatively, the same effects as above can be obtained by covering the surface of the composite oxide particles with lithium titanate, which expresses electrical conductivity as lithium becomes inserted, instead of the electro-conductive substance such as carbon. In addition, when the battery is internally short-circuited, lithium is released from the lithium titanate covering the surface of the composite oxide particles, whereupon the lithium titanate becomes insulating, and therefore, excellent safety can be exhibited.

<BET Specific Surface Area>

The BET specific surface area of the composite oxide included in the active material according to the first embodiment is not particularly limited, and is preferably greater than or equal to 5 $m^2/g$ and less than 200 $m^2/g$. The BET specific surface area is more preferably 5 $m^2/g$ to 30 $m^2/g$.

When the BET specific surface area is 5 $m^2/g$ or more, the contact area with the electrolyte can be secured. Thus, good discharge rate performances can be easily obtained and also, a charge time can be shortened. On the other hand, when the BET specific surface area is less than 200 $m^2/g$, reactivity with the electrolyte can be prevented from being too high and therefore, the life performance can be improved. When the BET specific surface area is 30 $m^2/g$ or less, side reactions with the electrolyte can be suppressed, and thereby even longer life can be expected. Additionally in this case, a coatability of a slurry including the active material used in the production of an electrode, which will be described later, can be improved.

Here, for the measurement of the specific surface area, a method is used where molecules, in which an occupied area in adsorption is known, are adsorbed onto the surface of powder particles at the temperature of liquid nitrogen, and the specific surface area of the sample is determined from the amount of adsorbed molecules. The most often used method is a BET method based on the low temperature/low humidity physical adsorption of an inert gas. This BET method is a method based on the BET theory, which is the most well-known theory of the method of calculating the specific surface area in which the Langmuir theory, which is a monolayer adsorption theory, is extended to multilayer adsorption. The specific surface area determined by the above method is referred to as "BET specific surface area".

<Production Method>

The composite oxide included in the active material according to the first embodiment can be synthesized, for example, by a sol-gel reaction method as described below.

First, raw materials, such as acetates, chlorides, and metal ethoxides are weighed out in stoichiometric ratio, and dissolved in a mixed solution of acid, base, and organic solvent, then heated and mixed to thus obtain a dry-gel.

Next, the dry-gel is fired. The firing is performed in air within a temperature range of 900° C. to 1300° C., for a total of 5 minutes to 60 minutes. At that time, lithium, which is a light element, may become vaporized by firing at a temperature of 900° C. or higher. In such a case, a vaporized amount of lithium under the firing conditions is checked, and the vaporized amount checked up is compensated for by providing raw material(s) including lithium in an excess amount to obtain a sample having a proper composition. Furthermore, it is more preferable to prevent a lattice defect due to oxygen deficiency or the like.

By performing such a high-temperature short-time firing, first, primary nuclei of an $Li_{2+w}Na_{2-x}M1_yTi_{6-z}M2_zO_{14+\delta}$ phase having vacancies is generated, and the vacancies are dispersed within the crystal structure at random. The firing temperature is then decreased, and low-temperature firing is performed at 500° C. to 800° C. for a total of 6 to 24 hours in air. By performing such low-temperature long-time firing, the phase generated during the aforementioned heating can be subjected to crystal growth. As a result, a single-phase composite oxide having both a small particle size and a large crystallite size can be obtained while maintaining vacancies at the sites within the crystal structure. When the single phase of the composite oxide is obtained, by virtue of a small amount of impurity, excellent performance as a battery active material can be exhibited.

When liquid phase mixing is performed when preparing a dry-gel, the materials are uniformly mixed at the atomic level. For this reason, a target crystal phase can be easily made to have a high crystallinity, even in low-temperature firing.

Note that in a general liquid phase synthesis method, a sample can be synthesized at a lower temperature as compared with the solid phase synthesis method. Therefore, there have been reporting of synthesis by low-temperature firing of a composite oxide represented by the general formula $Li_2Na_2Ti_6O_{14}$ and not having vacancies at the Na site. However, for the series of composite oxides represented by the general formula $Li_{2+w}Na_{2-x}Ti_{6-z}M2_zO_{14+\delta}$ and having vacancies at Na sites, a vacancy phase hardly forms during low-temperature firing and is separated into a more stable phase. For this reason, even if firing is performed only at a low temperature in the liquid phase synthesis method, a single phase cannot be obtained. If no single phase is obtained and an impurity phase is produced, the total amount of the composite oxide contributing to the charge-and-discharge capacity is reduced, thereby decreasing the capacity. In addition, there may be problems such as a decrease in coulomb efficiency due to the side reaction derived from an impurity and a decrease in output due to adsorption of impurity on the surface of the composite oxide. It is thus desirable to include a composite oxide including a single-phase active material.

Alternatively, the composite oxide included in the active material according to the first embodiment can be synthesized, for example, by generating the primary nuclei of the $Li_{2+w}Na_{2-x}M1_yTi_{6-z}M2_zO_{14+\delta}$ phase by a hydrothermal synthesis method described below, and subjecting the resultant phase to crystal growth, thereafter.

First, oxides, hydroxides, chlorides, or the like as raw materials are weighed out in stoichiometric ratio, and the weighed materials are added to an aqueous solvent containing an acid, a base, and water and is stirred to obtain a mixture.

Subsequently, the resultant mixture is heated. Heating is performed at a temperature range of 150° C. to 450° C. for a total time of 5 to 24 hours in a pressurized atmosphere by using, for example, an autoclave.

After the mixture is heated, a reaction product is recovered by filtration and dried. The resultant reaction product is fired. Firing is performed at a temperature range of 800° C. to 1100° C. for a total time of 10 min to 60 min in air. At that time, lithium, which is a light element, may become vaporized by firing at a temperature of 900° C. or higher. In such a case, a vaporized amount of lithium under the firing conditions is checked, and the vaporized amount checked up is compensated for by providing raw material(s) including lithium in an excess amount to obtain a sample having a proper composition. Furthermore, it is more preferable to prevent a lattice defect due to oxygen deficiency or the like.

As in the above-described sol-gel method, after the hydrothermal synthesis reaction, high-temperature short-time firing is performed to generate primary nuclei of the $Li_{2+w}Na_{2-x}M1_yTi_{6-z}M2_zO_{14+\delta}$ phase having vacancies, and at the same time, the vacancies within the crystal structure are dispersed randomly. After that, the firing temperature is decreased, and low-temperature firing is performed in the temperature range of 500° C. to 800° C. for a total of 6 to 24 hours in air. By performing such low-temperature long-time firing, the phase generated during the aforementioned heating can be subjected to crystal growth. As a result, a single-phase composite oxide having both a small particle size and a large crystallite size can be obtained while maintaining the vacancies at the sites within the crystal structure.

When the composite oxide obtained by the above-described synthesis has a symmetry in conformance with the space group Fmmm, the intensity ratio $I_{L1}/I_{H1}$ falls within $2.25 \leq I_{L1}/I_{H1} \leq 3.5$ in the X-ray diffraction diagram obtained according to the powder X-ray diffraction using Cu-Kα rays. The intensity $I_{L1}$ is an intensity of a diffraction peak corresponding to a (111) plane, appearing in a range of $17.8° \leq 2\theta \leq 18.5°$, and the intensity $I_{H1}$ is an intensity of a diffraction peak corresponding to a (202) plane, appearing in a range of $18.6° < 2\theta \leq 19.5°$.

When the synthesis is performed as described above, for example, the composite oxide represented by the above general formula wherein the subscript w is 0 can be produced, as explained above. When the composite oxide wherein the subscript w is 0 is incorporated as the negative electrode active material into a battery, and the resulting battery is charged, a state is achieved in which the Li amount w+2 in the formula is increased to a value greater than 2 and 6 or less. Alternatively, when a lithium source such as lithium acetate and lithium hydroxide is used as a raw material, and the composite oxide is synthesized in a raw material composition ratio such that the value of w would be greater than 0 and 4 or less, the composite oxide in a state in which the value of w+2 is greater than 2 and 6 or less can also be synthesized. In addition, the composite oxide in a state in which the value of w+2 is greater than 2 and 6 or less can also be obtained by, after the composite oxide is synthesized, immersing the composite oxide into the aqueous lithium hydroxide solution, or the like.

Next, a method for obtaining the X-ray diffraction diagram of the composite oxide according to a powder X-ray diffraction method, and a method for examining the composition of the composite oxide will be described.

When a target active material to be measured is included in an electrode material of a battery, a pre-treatment is performed as described below.

First, a state close to the state in which Li ions are completely extracted from the active material is achieved. For example, when the target active material to be measured is included in a negative electrode, the battery is brought into a completely discharged state. For example, a battery can be discharged in a 25° C. environment at 0.1 C current to a rated end voltage, whereby the discharged state of the battery can be achieved. Although a slight amount of residual Li ions may exist even in the discharged state, this does not significantly affect results of powder X-ray diffraction measurement described below.

Next, the battery is disassembled in a glove box filled with argon, and the electrode is taken out. The taken-out electrode is washed with an appropriate solvent and dried under reduced pressure. For example, ethyl methyl carbonate may be used for washing. After washing and drying, whether or not there are white precipitates such as a lithium salt on the surface is examined.

The washed electrode is processed or treated into a measurement sample as appropriate, depending on the measurement method to be subjected to. For example, in the case of subjecting to the powder X-ray diffraction measurement, the washed electrode is cut into a size having the same area as that of a holder of the powder X-ray diffraction apparatus, and used as a measurement sample.

When necessary, the active material is extracted from the electrode to be used as a measurement sample. For example, in the case of subjecting to a composition analysis, the active material is taken out from the washed electrode, and the taken-out active material is analyzed, as described later.

<Method for Obtaining X-Ray Diffraction Diagram of Composite Oxide According to Powder X-Ray Diffraction>

The crystal structure included in the active material can be examined by powder X-Ray Diffraction (XRD). By analyzing the measurement results of the powder X-Ray Diffraction, the crystal structure included in the composite oxide that is included in the active material according to the embodiment can be examined, for example.

The powder X-ray diffraction measurement of the active material is performed as follows:

First, the target sample is ground until an average particle size reaches about 5 μm. Even if the original average particle size is less than 5 μm, it is preferable that the sample is subjected to a grinding treatment with a mortar, or the like, in order to grind apart aggregates. The average particle size can be obtained by laser diffraction, for example.

The ground sample is filled in a holder part having a depth of 0.5 mm, formed on a glass sample plate. As the glass sample plate, for example, a glass sample plate manufactured by Rigaku Corporation is used. At this time, care should be taken to fill the holder part sufficiently with the sample. Precaution should be taken to avoid cracking and formation of voids caused by insufficient filling of the sample. Then, another glass plate is used to smoothen the surface of the sample by sufficiently pressing the glass plate against the sample. In this case, precaution should be taken to avoid too much or too little a filling amount, so as to prevent any rises and dents in the basic plane of the glass holder.

Next, the glass plate filled with the sample is set in a powder X-ray diffractometer, and a diffraction pattern (XRD pattern; X-Ray Diffraction pattern) is obtained using Cu-Kα rays.

When the target active material to be measured is included in the electrode material of a secondary battery, first, a measurement sample is prepared according to the previously described procedure. The obtained measurement sample is affixed directly to the glass holder, and measured.

Upon which, the position of the peak originating from the electrode substrate such as a metal foil is measured in advance. The peaks of other components such as an electro-conductive agent and a binder are also measured in advance. In such a case that the peaks of the substrate and active material overlap with each other, it is desirable that the layer including the active material (e.g., the later-described electrode active material-containing layer) is separated from the substrate, and subjected to measurement. This is in order to separate the overlapping peaks when quantitatively measuring the peak intensity. For example, the electrode active material-containing layer can be separated by irradiating the electrode substrate with an ultrasonic wave in a solvent.

In the case where there is high degree of orientation in the sample, there is the possibility of deviation of peak position and variation in an intensity ratio, depending on how the sample is filled. For example, in some cases, there may be observed from the results of the later-described Rietveld analysis, an orientation in which crystal planes are arranged in a specific direction when packing the sample, depending on the shapes of particles. Alternatively, in some cases, influence due to orientation can be seen from measuring of a measurement sample that had been obtained by taking out from a battery.

Such a sample having high orientation is measured using a capillary (cylindrical glass narrow tube). Specifically, the sample is inserted into the capillary, which is then mounted on a rotary sample table and measured while being rotated. Such a measuring method can provide the result with the influence of orientation reduced.

When an intensity ratio measured by this method is different from an intensity ratio measured using the flat plate holder or glass holder described above, the influence due to the orientation is considerable, such that measurement results of the rotary sample table are adopted.

As an apparatus for powder X-ray diffraction measurement, SmartLab manufactured by Rigaku is used, for example. Measurement is performed under the following condition:

X-ray source: Cu target
Output: 45 kV, 200 mA
soller slit: 5 degrees in both incident light and received light
step width (2θ): 0.01 deg
scan speed: 10 deg/min
semiconductor detector: D/teX Ultra 250
sample plate holder: flat glass sample plate holder (0.5 mm thick)
measurement range: $5° ≤ 2θ ≤ 80°$ When another apparatus is used, in order to obtain measurement results equivalent to those described above, measurement using a standard Si powder for powder X-ray diffraction is performed, and measurement is conducted with conditions adjusted such that a peak intensity and a peak top position correspond to those obtained using the above apparatus.

Conditions of the above powder X-ray diffraction measurement are set, such that an XRD pattern applicable to Rietveld analysis is obtained. In order to collect data for Rietveld analysis, specifically, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from the crystal structure model which has been previously estimated. The parameters of the crystal structure (lattice constant, atomic coordinate, crystal site occupancy ratio, or the like) can be precisely analyzed by fitting all the calculated values with the measured values. Thereby, the characteristics of the crystal structure of the synthesized composite oxide can be determined. Furthermore, the site occupancy ratio g of compositional elements in each of the sites can be determined. A fitting parameter S is used as the scale for estimating the degree of agreement between the measured intensities and the calculated intensities in the Rietveld analysis. Analysis must be performed in a manner such that the S value would be less than 1.8. When determining the occupancies in each of the sites, the standard deviation $\sigma_j$ must be taken into consideration. The fitting parameter S and standard deviation $\sigma_j$ defined herein are estimated using the formula described in "Funmatsu X sen Kaisetsu no Jissai (Reality of Powder X-Ray Analysis", X-Ray Analysis Investigation Conversazione, The Japan Society for Analytical Chemistry, written and edited by Izumi Nakai and Fujio Izumi (Asakura Publishing Co., Ltd.)).

Using the above-described method, information on the crystal structure of the measured active material can be obtained. For example, when the active material according to the first embodiment is measured as described above, the measured active material would be found to include a composite oxide having an orthorhombic structure. In addition, the above-described measurement also allows examination of the symmetry of the crystal structure in the measurement sample, such as the space group Fmmm.

Furthermore, the existence or non-existence of vacancies and the amount of vacancies can be determined by more precisely refining the occupancy ratio g of constituent elements in each of the sites. For example, to determine the existence or non-existence of vacancies in the Na sites of a crystal represented by the general formula $Li_{2+w}Na_{2-x}M1_yTi_{6-z}M2_zO_{14+\delta}$, Rietveld analysis may be performed while changing the site occupancy ratio of Na. First, take the fitting parameter in Rietveld analysis performed when the occupancy ratio g of 1.0, i.e., when the occupancy is 100%, to be $S_{100}$. Then, take the fitting parameter in Rietveld analysis performed when the occupancy ratio g of lower than 1.0, i.e., when the occupancy is lower than 100%, to be $S_{vacant}$. If $S_{100}$ is greater than $S_{vacant}$ ($S_{100} > S_{vacant}$), it can be determined that vacancies exist in the Na sites. Also, the amount of vacancies (x−y) introduced into the Na sites can be estimated by further precisely refining the site occupancy ratio g. In this case, the site occupancy ratio of a light element, such as Li, also need be determined. Therefore, it is preferable that the analysis be performed using neutron powder diffraction.

On the other hand, in order to determine the intensities $I_L$ and $I_H$ ($I_{L1}$ and $I_{H1}$) of diffraction peaks for the composite oxide, the powder X-ray diffraction results measured under the above conditions are left unprocessed, and raw data is used. The peak top, i.e., the maximum intensity of a strongest diffraction peak appearing within the range of $17° \le 2\theta \le 18.5°$ is defined as $I_L$. On the other hand, the peak top, i.e., the maximum intensity of a strongest diffraction peak appearing within the range of $18.5° < 2\theta \le 19.5°$ is defined as $I_H$. An intensity ratio $I_L/I_H$ can be calculated by dividing the intensity numerical value (counts per second: cps) of the intensity $I_L$ by the intensity numerical value (cps) of the intensity $I_H$.

An average crystallite size in an active material can be examined from raw data of the powder X-ray diffraction measured under the above conditions. Among the diffraction peaks of the main phase appearing within the range of $18.5° < 2\theta \le 19.5°$, the integral breadth of the diffraction peak having the highest intensity can be used to calculate the average crystallite size by the Scherrer method. The Scherrer equation is shown below:

$$D = K\lambda/\beta \cos\theta$$

where $\lambda$ is the X-ray wavelength, $\theta$ is the Bragg angle, $\beta$ is the integration width of the diffraction peak, and K is the Scherrer constant.

Note that the Scherrer constant used in the calculation is 4/3. The crystallite size thus calculated is defined as the average crystallite size.

<Method for Examining Composition of Composite Oxide>

The composition in the active material can be analyzed using Inductively Coupled Plasma (ICP) emission spectrometry, for example. In this case, the abundance ratios of elements depend on the sensitivity of the analyzing device used. Therefore, when the composition in an example of the active material according to the first embodiment is analyzed using ICP emission spectrometry, for example, the numerical values may deviate from the previously described element ratios due to errors of the measuring device. However, even if the measurement results deviate as described above within the error range of the analyzing device, the example of the active material according to the first embodiment can sufficiently exhibit the previously described effects.

In order to measure the composition of the active material assembled into a battery according to ICP emission spectrometry, the following procedure is specifically performed.

First, according to the previously described procedure, an electrode including the target active material to be measured is taken out from a battery, and washed. The washed electrode unit is put in a suitable solvent, and irradiated with an ultrasonic wave. For example, an electrode unit is put into ethyl methyl carbonate in a glass beaker, and the glass beaker is vibrated in an ultrasonic washing machine, and thereby an electrode active material-containing layer including the electrode active material can be separated from a current collector.

Next, the separated electrode active material-containing layer is dried under reduced pressure. The obtained active material-containing layer is ground in a mortar or the like to provide a powder including the target active material, electro-conductive agent, binder, and the like. By dissolving the powder in an acid, a liquid sample including the active material can be prepared. Here, hydrochloric acid, nitric acid, sulfuric acid, hydrogen fluoride, and the like may be used as the acid. The components in the active material, for example, composition of the composite oxide included in the active material can be found by subjecting the liquid sample to ICP emission spectrometric analysis.

<Method of Examining Primary Particle Size of Composite Oxide>

The average primary particle size of an active material can be examined using, for example, an SEM (Scanning Electron Microscope).

For example, a scanning electron microscope SU8020 manufactured by Hitachi High Technologies can be used to acquire an SEM image. The active material is ground in a mortar, and agglomeration of particles is broken apart as much as possible. A conductive tape is adhered to a sample table, and the active material is placed on the sample table in an appropriate amount. The height of the sample table is adjusted using an equipped accessory.

The conditions at the time of SEM observation are an acceleration voltage of 3.0 V and a current value of 10.0 µA. Observation is performed by setting the magnification of 10,000 to 30,000 as a magnification at which the primary particle size can be examined.

The primary particle size is defined as follows. 50 primary particles in the SEM image are selected at random, and are simulated as spheres, using the maximum distance of each particle as the diameter. The average value of the diameters of the primary particles is calculated and is defined as the average primary particle size.

If an active material as the measurement target is included in the electrode material of a battery, following the same procedure as described above, an electrode is extracted from the battery, the extracted electrode is washed and dried, and the dried electrode is cut into an appropriate size, thereby obtaining a measurement sample. The resultant measurement sample is affixed to the sample table with a conductive tape and observed. When calculating the average primary particle size, the active material particles are identified in advance, for example, by an EDX (Energy Dispersive X-ray spectroscopy) or the like, to thereby calculate the primary particle size with the sub-members such as an electro-conductive agent contained in the electrode excluded from the calculation result. In this manner, it is possible to not include the sub-members in the electrode, into the calculation result of the average primary particle size.

According to the first embodiment, the active material including the composite oxide having the orthorhombic crystal structure is provided. The composite oxide has a composition represented by the general formula $Li_{2+w}Na_{2-x}M1_yTi_{6-z}M2_zO_{14+\delta}$. The composite oxide can exhibit a large potential change associated to a change of capacity within a potential range of 1.0 V (vs. Li/Li$^+$) to 1.45 V (vs. Li/Li$^+$). The particles of the composite oxide have an average crystallite size of 50 nm to 90 nm and an average primary particle size of 0.1 µm to 0.6 µm. In addition, the average operating potential of the composite oxide can be controlled by changing the Na amount.

Further, the composite oxide can have a crystal structure in which lithium ions are easily inserted into and extracted from the crystal structure, and thus able to realize high reversible capacity during charge and discharge and excellent life performance. In addition, the lithium ion diffusion distance within the active material is reduced, and thus the input-output performance of batteries can be increased.

As a result, the active material according to the first embodiment can realize a secondary battery which can exhibit a high energy density, a high battery voltage, excellent life performance, and high input-output performance, and in which voltage management can be easily performed.

Second and Third Embodiments

According to the second embodiment, provided is an electrode, and according to the third embodiment, provided is a secondary battery.

The electrode according to the second embodiment includes the active material according to the first embodiment. The active material may be included in an active material-containing layer that is included in the electrode. As described later, the active material-containing layer may further include a conductive agent and a binder. This electrode may serve as a battery electrode including the active material according to the first embodiment as the battery active material.

The secondary battery according to the third embodiment includes a negative electrode that contains the active material according to the first embodiment as a battery active material, a positive electrode, and an electrolyte. The electrode according to the second embodiment and the secondary battery according to the third embodiment will now be described together as a case using the electrode as the negative electrode of the secondary battery.

The secondary battery according to the third embodiment may further include a separator provided between the positive electrode and the negative electrode. The negative electrode, the positive electrode, and the separator can structure an electrode group. The electrolyte may be held in the electrode group.

The secondary battery according to the third embodiment may further include a container member that houses the electrode group and the electrolyte.

The secondary battery according to the third embodiment may further include a negative electrode terminal electrically connected to the negative electrode and a positive electrode terminal electrically connected to the positive electrode.

The secondary battery according to the third embodiment includes nonaqueous electrolyte batteries containing nonaqueous electrolyte(s).

Hereinafter, the negative electrode, the positive electrode, the electrolyte, the separator, the container member, the negative electrode terminal, and the positive electrode terminal will be described in detail.

1) Negative Electrode

The negative electrode may include a negative electrode current collector and a negative electrode active material-containing layer. The negative electrode active material-containing layer may be formed on one surface or both of reverse surfaces of the negative electrode current collector. The negative electrode active material-containing layer may include a negative electrode active material, and optionally an electro-conductive agent and a binder.

The active material according to the first embodiment may be contained in the negative electrode active material-containing layer as the negative electrode active material. The negative electrode using the active material according to the first embodiment can be stably charged and discharged even at a high temperature of 45° C. or more within a potential range of from 1.4 V (vs. Li/Li$^+$) to 1.0 V (vs. Li/Li$^+$). For this reason, the secondary battery according to the third embodiment including such a negative electrode can exhibit a high energy density and obtain excellent life performance even at a high temperature of 45° C. or more.

In the negative electrode using the active material according to the first embodiment, the average operating potential can be controlled, as described above. Further, the active material according to the first embodiment can exhibit a high reversible capacity during the charge-and-discharge and excellent life performance and output performance, as described above. For those reasons, the secondary battery according to the third embodiment including such a negative electrode can exhibit a high energy density, a high battery voltage, excellent life performance, and high input-and-output performance, and voltage management can be performed easily.

In the negative electrode, the active material according to the first embodiment may be singly used as the negative electrode active material, or two or more kinds of the active material according to the first embodiment may be used. Furthermore, a mixture where one kind or two or more kinds of the active material according to the first embodiment is further mixed with one kind or two or more kinds of other active materials may also be used as the negative electrode active material. Examples of other active materials include lithium titanate having a ramsdellite structure (e.g., $Li_2Ti_3O_7$), lithium titanate having a spinel structure (e.g., $Li_4Ti_5O_{12}$), monoclinic titanium dioxide ($TiO_2$), anatase type titanium dioxide, rutile type titanium dioxide, a hollandite type titanium composite oxide, an orthorhombic Na-containing titanium composite oxide (e.g., $Li_2Na_2Ti_6O_{14}$), and a monoclinic niobium titanium composite oxide (e.g., $Nb_2TiO_7$).

The electro-conductive agent is added to improve a current collection performance and to suppress the contact resistance between the negative electrode active material and the current collector. Examples of the electro-conductive agent include carbonaceous substances such as vapor grown carbon fiber (VGCF), acetylene black, carbon black, and graphite. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the negative electrode active material particle.

The binder is added to fill gaps among the dispersed negative electrode active material and also to bind the negative electrode active material with the negative electrode current collector. Examples of the binder include polytetrafluoroethylene (PTFE), polyvinylidene fluoride (PVdF), fluorine rubber, styrene-butadiene rubber, polyacrylate compounds, and imide compounds. One of these may be used as the binder, or two or more may be used in combination as the binder.

The active material, electro-conductive agent and binder in the negative electrode active material-containing layer are preferably blended in proportions of 68% by mass to 96% by mass, 2% by mass to 30% by mass, and 2% by mass to 30% by mass, respectively. When the amount of electro-conductive agent is 2% by mass or more, the current collection performance of the negative electrode active material-containing layer can be improved. When the amount of binder is 2% by mass or more, binding between the negative electrode active material-containing layer and negative electrode current collector is sufficient, and excellent cycling performances can be expected. On the other hand, an amount of each of the electro-conductive agent and binder is preferably 28% by mass or less, in view of increasing the capacity.

As the negative electrode current collector, a material which is electrochemically stable at the lithium insertion and extraction potential (vs. $Li/Li^+$) of the negative electrode active material is used. The negative electrode current collector is preferably made of copper, nickel, stainless steel, aluminum, or an aluminum alloy including one or more elements selected from the group consisting of Mg, Ti, Zn, Mn, Fe, Cu, and Si. The thickness of the negative electrode current collector is preferably from 5 μm to 20 μm. The negative electrode current collector having such a thickness can maintain balance between the strength and weight reduction of the negative electrode.

The density of the negative electrode active material-containing layer (excluding the current collector) is preferably from 1.8 g/cm³ to 2.8 g/cm³. The negative electrode, in which the density of the negative electrode active material-containing layer is within this range, is excellent in energy density and ability to hold the electrolyte. The density of the negative electrode active material-containing layer is more preferably from 2.1 g/cm³ to 2.6 g/cm³.

The negative electrode may be produced by the following method, for example. First, a negative electrode active material, an electro-conductive agent, and a binder are suspended in a solvent to prepare a slurry. The slurry is applied onto one surface or both of reverse surfaces of a negative electrode current collector. Next, the applied slurry is dried to form a layered stack of the negative electrode active material-containing layer and the negative electrode current collector. Then, the layered stack is subjected to pressing. The negative electrode can be produced in this manner. Alternatively, the negative electrode may also be produced by the following method. First, a negative electrode active material, an electro-conductive agent, and a binder are mixed to obtain a mixture. Next, the mixture is formed into pellets. Then the negative electrode can be obtained by arranging the pellets on the negative electrode current collector.

2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may include one kind of positive electrode active material, or alternatively, include two or more kinds of positive electrode active materials. Examples of the oxide and sulfide include compounds capable of having Li (lithium) and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($LiNi_{1-x-y}Co_xMn_yO_2$; $0<x<1$, $0<y<1$, $x+y<1$). As the active material, one of these compounds may be used singly, or plural compounds may be used in combination.

More preferred examples of the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $LiNi_{1-y}Co_yO_2$; $0<x\leq1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($LiNi_{1-x-y}Co_xMn_yO_2$; $0<x<1$, $0<y<1$, $x+y<1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle size of the positive electrode active material is preferably from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably from 0.1 $m^2/g$ to 10 $m^2/g$. The positive electrode active material having a specific surface area of 0.1 $m^2/g$ or more can secure sufficient sites for inserting and extracting Li ions. The positive electrode active material having a specific surface area of 10 $m^2/g$ or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, and imide compounds. One of these may be used as the binder, or two or more may be used in combination as the binder.

The electro-conductive agent is added to improve a current collection performance and to suppress the contact resistance between the positive electrode active material and the positive electrode current collector. Examples of the electro-conductive agent include carbonaceous substances such as vapor grown carbon fiber (VGCF), acetylene black, carbon black, and graphite. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. When the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, the decomposition of a electrolyte can be reduced during storage under high temperatures.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode may be produced by the following method, for example. First, a positive electrode active material, an electro-conductive agent, and a binder are suspended in a solvent to prepare a slurry. The slurry is applied onto one surface or both of reverse surfaces of a positive electrode current collector. Next, the applied slurry is dried to form a layered stack of the positive electrode active material-containing layer and the positive electrode current collector. Then, the layered stack is subjected to pressing. The positive electrode can be produced in this manner. Alternatively, the positive electrode may also be produced by the following method. First, a positive electrode active material, an electro-conductive agent, and a binder are mixed to obtain a mixture. Next, the mixture is formed into pellets. Then the positive electrode can be obtained by arranging the pellets on the positive electrode current collector.

3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) including lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in nonaqueous electrolyte batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

4) Separator

The separator may be made of, for example, a porous film or synthetic resin nonwoven fabric including polyethylene, polypropylene, cellulose, or polyvinylidene fluoride (PVdF). In view of safety, a porous film made of polyethylene or polypropylene is preferred. This is because such a porous film melts at a fixed temperature and thus able to shut off current.

5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 1% by mass or less.

The shape of the container member is not particularly limited. The shape of the container member may be, for example, flat (thin), square, cylinder, coin, or button-shaped. Depending on battery size, the container member may be, for example, a container member for compact batteries installed in mobile electronic devices, or container member for large batteries installed on vehicles such as two-wheeled to four-wheeled automobiles, railway cars, and the like.

6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

7) Positive Electrode Terminal

The positive electrode terminal may be made of, for example, a material that is electrically stable in the potential range of 3 V to 5 V (vs. Li/Li$^+$) relative to the oxidation-and-reduction potential of lithium, and has electrical conductivity. Examples of the material for the positive electrode terminal include aluminum and an aluminum alloy containing one or more selected from the group consisting of Mg, Ti, Zn, Mn, Fe, Cu, Si, and the like. The positive electrode terminal is preferably made of the same material as the positive electrode current collector, in order to reduce contact resistance with the positive electrode current collector.

Next, the secondary battery according to the third embodiment will be more specifically described with reference to the drawings.

FIG. 3 is a cross-sectional view schematically showing an example of a secondary battery according to the second embodiment. FIG. 4 is an enlarged cross-sectional view of section A of the secondary battery shown in FIG. 3.

The secondary battery 100 shown in FIGS. 3 and 4 includes a bag-shaped container member 2 shown in FIG. 3, an electrode group 1 shown in FIGS. 3 and 4, and an electrolyte, which is not shown. The electrode group 1 and the electrolyte are housed in the container member 2. The electrolyte (not shown) is held in the electrode group 1.

The bag-shaped container member 2 is made of a laminate film including two resin layers and a metal layer sandwiched between the resin layers.

As shown in FIG. 3, the electrode group 1 is a wound electrode group in a flat form. The wound electrode group 1 in a flat form includes a negative electrode 3, a separator 4, and a positive electrode 5, as shown in FIG. 4. The separator 4 is sandwiched between the negative electrode 3 and the positive electrode 5.

The negative electrode 3 includes a negative electrode current collector 3a and a negative electrode active material-containing layer 3b. The active material according to the first embodiment is included in the negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 4. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 3, a negative electrode terminal 6 and positive electrode terminal 7 are positioned in vicinity of the outer peripheral edge of the wound electrode group 1. The negative electrode terminal 6 is connected to a portion of the negative electrode current collector 3a of the negative electrode 3 positioned outermost. The positive electrode terminal 7 is connected to the positive electrode current collector 5a of the positive electrode 5 positioned outermost. The negative electrode terminal 6 and the positive electrode terminal 7 extend out from an opening of the bag-shaped container member 2. The bag-shaped container member 2 is heat-sealed by a thermoplastic resin layer arranged on the interior thereof.

Figure 6:
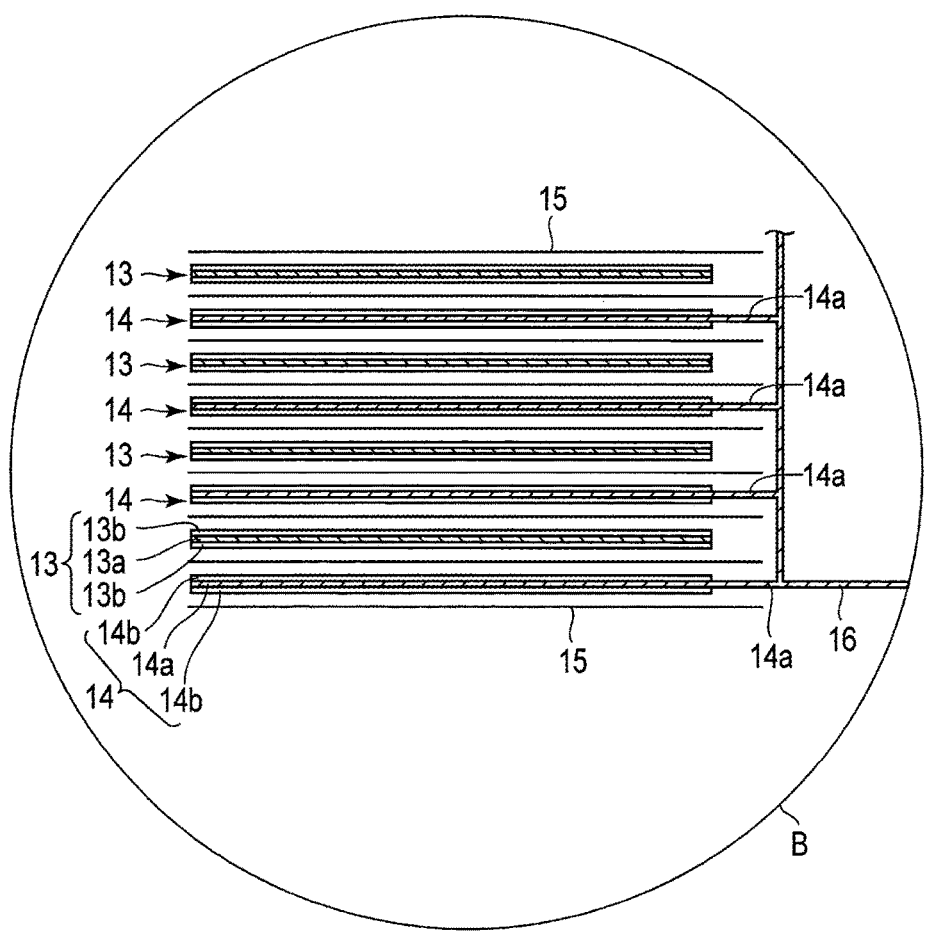
FIG. 6 is an enlarged cross sectional view of section B of the secondary battery shown in FIG. 5.

The secondary battery according to the third embodiment is not limited to the secondary battery of the structure shown in FIGS. 3 and 4, and may be, for example, a battery of a structure as shown in FIGS. 5 and 6.

FIG. 5 is a partially cut-out perspective view schematically showing another example of a secondary battery according to the third embodiment. FIG. 6 is an enlarged cross-sectional view of section B of the secondary battery shown in FIG. 5.

The secondary battery 100 shown in FIGS. 5 and 6 includes an electrode group 11 shown in FIGS. 5 and 6, a container member 12 shown in FIG. 5, and an electrolyte, which is not shown. The electrode group 11 and the electrolyte are housed in the container member 12. The electrolyte is held in the electrode group 11.

The container member 12 is made of a laminate film including two resin layers and a metal layer sandwiched between the resin layers.

As shown in FIG. 6, the electrode group 11 is a stacked electrode group. The stacked electrode group 11 has a structure in which positive electrodes 13 and negative electrodes 14 are alternately stacked with separator(s) 15 sandwiched therebetween.

The electrode group 11 includes plural positive electrodes 13. Each of the plural positive electrodes 13 includes a positive electrode current collector 13a, and positive electrode active material-containing layers 13b supported on both of reverse surfaces of the positive electrode current collector 13a. The electrode group 11 includes plural negative electrodes 14. Each of the plural negative electrodes 14 includes a negative electrode current collector 14a, and negative electrode active material-containing layers 14b supported on both of reverse surfaces of the negative electrode current collector 14a. An end of the negative electrode current collector 14a of each of the negative electrodes 14 protrudes out from the negative electrode 14. The protruded negative electrode current collector 14a is electrically connected to a strip-shaped negative electrode terminal 16. The tip of the strip-shaped negative electrode terminal 16 is extended out from the container member 12. Although not shown in the drawings, an end of each positive electrode current collector 13a of the positive electrodes 13, which is positioned on the side opposite to the protruded end of the negative electrode current collector 14a, protrude out from the positive electrode 13. The positive electrode current collector 13a protruding out from the positive electrode 13 is electrically connected to a strip-shaped positive electrode terminal 17. The tip of the strip-shaped positive electrode terminal 17 is positioned on the opposite side from the negative electrode terminal 16, and extended out from the container member 12.

The secondary battery according to the third embodiment includes the active material according to the first embodiment. Thus, the secondary battery according to the third embodiment can exhibit a high energy density, a high battery voltage, excellent life performance, and high input-output performance. In addition, voltage management of the secondary battery can be performed easily.

In addition, when the secondary battery is, for example, combined with a 12 V lead storage battery for automobiles to thereby configure a motor assist type hybrid car or an idling stop system (a.k.a., automatic start-stop system), it is possible to design a setting of battery pack potential that is capable of preventing over-discharge of a lead storage battery upon a high load or is capable of adapting to a fluctuation in potential upon an input of regenerative energy. This is because, in the end period of discharge of the secondary battery of the third embodiment, the decrease in voltage is smooth and moderate. Since the voltage changes smoothly in accordance with the charge and discharge of the secondary battery, the state of charge (SOC) can be managed based on the voltage change. Accordingly, the voltage in the end period of discharge can be easily managed, and the secondary battery can be favorably used in a system where the battery is combined with the lead storage battery.

Further, in the case where a spinel lithium titanate ($Li_4Ti_5O_{12}$) is used for the negative electrode, the average operating potential is low. Thus, it is necessary to connect six batteries in series, in order to obtain a voltage compatible with a lead storage battery for automobiles. On the other hand, when the active material of the first embodiment is used as the negative electrode active material, the average operating potential of the negative electrode is decreased, and the battery voltage becomes high. Thus, even if the number of in-series connection of the battery cells in the battery pack is changed to five, it is possible to configure a battery pack having high voltage compatibility with 12 V lead storage batteries for automobiles. Namely, the secondary battery according to the third embodiment is able to provide a small size battery pack capable of exhibiting a low resistance and a high energy density at a low cost.

Fourth Embodiment

According to a fourth embodiment, a battery module is provided. The battery module according to the fourth embodiment includes plural secondary batteries according to the third embodiment.

In the battery module according to the fourth embodiment, each of the single batteries may be arranged electrically connected in series, in parallel, or in a combination of in-series connection and in-parallel connection.

An example of the battery module according to the fourth embodiment will be described next with reference to the drawings.

FIG. 7 is a perspective view schematically showing an example of the battery module according to the fourth embodiment. A battery module 200 shown in FIG. 7 includes five single-batteries 100, four bus bars 21, a positive electrode-side lead 22, and a negative electrode-side lead 23. Each of the five single-batteries 100 is a secondary battery according to the third embodiment.

Each bus bar 21 connects a negative electrode terminal 6 of one single-battery 100 and a positive electrode terminal 7 of the single-battery 100 positioned adjacent. The five single-batteries 100 are thus connected in series by the four bus bars 21. That is, the battery module 200 shown in FIG. 7 is a battery module of five in-series connection.

As shown in FIG. 7, the positive electrode terminal 7 of the single-battery 100 located at one end on the left among the row of the five single-batteries 100 is connected to the positive electrode-side lead 22 for external connection. In addition, the negative electrode terminal 6 of the single-battery 100 located at the other end on the right among the row of the five single-batteries 100 is connected to the negative electrode-side lead 23 for external connection.

The battery module according to the fourth embodiment includes the secondary battery according to the third embodiment. Hence, the battery module can exhibit a high energy density, a high battery voltage, excellent life performance, and high input-output performance. In addition, voltage management of the battery module can be performed easily.

Fifth Embodiment

According to a fifth embodiment, a battery pack is provided. The battery pack includes a battery module according to the fourth embodiment. The battery pack may include a single secondary battery according to the third embodiment, in place of the battery module according to the fourth embodiment.

The battery pack according to the fifth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fifth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fifth embodiment will be described with reference to the drawings.

FIG. 8 is an exploded perspective view schematically showing an example of the battery pack according to the fifth embodiment. FIG. 9 is a block diagram showing an example of an electric circuit of the battery pack shown in FIG. 8.

A battery pack 300 shown in FIGS. 8 and 9 includes a housing container 31, a lid 32, protective sheets 33, a battery module 200, a printed wiring board 34, wires 35, and an insulating plate (not shown).

The housing container 31 is configured to house the protective sheets 33, the battery module 200, the printed wiring board 34, and the wires 35. The lid 32 covers the housing container 31 to house the battery module 200 and the like. Although not shown, opening(s) or connection terminal(s) for connecting to external device(s) and the like are provided on the housing container 31 and lid 32.

The protective sheets 33 are arranged on both inner surfaces of the housing container 31 along the long-side direction and on the inner surface along the short-side direction facing the printed wiring board 34 across the battery module 200 positioned therebetween. The protective sheets 33 are made of, for example, resin or rubber.

The battery module 200 includes plural single-batteries 100, a positive electrode-side lead 22, a negative electrode-side lead 23, and an adhesive tape 24. The battery module 200 may alternatively include only one single-battery 100.

A single-battery 100, for example, has a structure shown in FIGS. 3 and 4. At least one of the plural single-batteries 100 is a secondary battery according to the third embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 9. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape 24 fastens the plural single-batteries 100. The plural single-batteries 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each single-battery 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective circuit 344 controls charge and discharge of the plural single-batteries 100. The protective circuit 344 is also configured to cut-off electric connection between the protective circuit 344 and the external power distribution terminal 347 to external device(s), based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 is a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 344, a circuit included in a device (for example, an electronic device or an automobile) that uses the battery pack 300 as a power source may be used.

Such a battery pack 300 is used, for example, in applications where excellent cycle performance is demanded when a large current is extracted. More specifically, the battery pack 300 is used as, for example, a power source for electronic devices, a stationary battery, an onboard battery for vehicles, or a battery for railway cars. An example of the electronic device is a digital camera. The battery pack 300 is particularly favorably used as an onboard battery.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

The battery pack according to the fifth embodiment includes the secondary battery according to the third embodiment or the battery module according to the fourth embodiment. Hence, the battery pack can exhibit a high energy density, high battery voltage, excellent life performance, and high input-output performance.

In addition, since the secondary battery according to the third embodiment is included, a voltage decrease in the end period of discharge is smooth and moderate. It is therefore possible to manage the SOC (State Of Charge) of the battery pack based on voltage change, and thus, voltage management in the end period of discharge is easy.

Sixth Embodiment

According to a sixth embodiment, a vehicle is provided. The battery pack according to the fifth embodiment is installed on this vehicle.

In the vehicle according to the sixth embodiment, the battery pack is configured, for example, to recover regenerative energy from motive force of the vehicle.

Examples of the vehicle according to the sixth embodiment include two-wheeled to four-wheeled hybrid electric automobiles, two-wheeled to four-wheeled electric automobiles, electric assist bicycles, and railway cars.

In the vehicle according to the sixth embodiment, the installing position of the battery pack is not particularly limited. For example, the battery pack may be installed in the engine compartment of the vehicle, in rear parts of the vehicle, or under seats.

An example of the vehicle according to the sixth embodiment is explained below, with reference to the drawings.

FIG. 10 is a cross-sectional view schematically showing an example of a vehicle according to the sixth embodiment.

A vehicle 400, shown in FIG. 10 includes a vehicle body 40 and a battery pack 300 according to the fifth embodiment.

In FIG. 10, the vehicle 400 is a four-wheeled automobile. As the vehicle 400, for example, two-wheeled to four-wheeled hybrid electric automobiles, two-wheeled to four-wheeled electric automobiles, electric assist bicycles, and railway cars may be used.

This vehicle 400 may have plural battery packs 300 installed. In such a case, the battery packs 300 may be connected in series, connected in parallel, or connected in a combination of in-series connection and in-parallel connection.

The battery pack 300 is installed in an engine compartment located at the front of the vehicle body 40. The location of installing the battery pack 300 is not particularly limited. The battery pack 300 may be installed in rear sections of the vehicle body 40, or under a seat. The battery pack 300 may be used as a power source of the vehicle 400. The battery pack 300 can also recover regenerative energy of motive force of the vehicle 400.

Next, with reference to FIG. 11, an aspect of operation of the vehicle according to the sixth embodiment is explained.

FIG. 11 is a view schematically showing another example of the vehicle according to the sixth embodiment. A vehicle 400, shown in FIG. 11, is an electric automobile.

The vehicle 400, shown in FIG. 11, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 11, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit (VTM: voltage temperature monitoring) 301a. The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the third embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 11) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near the switch elements.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 42, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the sixth embodiment includes the battery pack according to the fifth embodiment. Hence, by virtue of the battery pack exhibiting a high energy density, high battery voltage, and high input-output performance, a high-performance vehicle can be provided. Additionally, since the battery pack exhibits excellent high-temperature life performance, the reliability of the vehicle is high. In addition, since the SOC (state of charge) of the battery pack can be managed based on voltage change, SOC of the battery pack installed on the vehicle can be easily comprehended.

EXAMPLES

Hereinafter, the above embodiments will be described in more detail referring to Examples. The identification of a crystal phase and estimation of a crystal structure of each of synthesized products was performed by powder X-ray diffraction using Cu-Kα rays.

Synthesis

Examples A

Examples A-1 to A-9

Composite oxides having the compositions represented by the general formula $Li_2Na_{2-x}Ti_{6-x}Nb_xO_{14}$ shown in Table 1 were synthesized by the sol-gel method.

Commercially available acetate and metal ethoxide reagents were provided as starting materials such that they satisfied a predetermined molar ratio and the total weight was 10 g. The molar ratios of the materials are shown in Table 2. In a preliminary experiment, when the vaporized amount of lithium ions during firing was analyzed, since the vaporized amount corresponding to 3% in terms of amount of lithium acetate was confirmed, lithium acetate was provided in 3% excess relative to the target composition.

Subsequently, the acetate was dissolved in 10 mL of a solution mixture of ethanol and acetic acid (ethanol:acetic acid=3:5 in weight ratio), the ethoxide reagent was then added dropwise into the mixture, and mixing and heating were performed to produce a dry-gel.

The resultant dry-gel was placed in an electric furnace and heated according to the following procedures.

First of all, the sample (the dry-gel) was placed in the electric furnace, and the first firing was performed at a temperature of 1,000° C. for 30 min air. The temperature rise rate of heating was set to 20° C./min. In this manner, by performing high-temperature short-time heating, the primary nuclei of the $Li_2Na_{2-x}Ti_{6-x}Nb_xO_{14}$ phase having vacancies were generated, and the vacancies were dispersed within the crystal structure.

The resultant mixture was ground and mixed. Subsequently, the second firing was performed at a temperature of 600° C. for 24 hours in air. By performing such low-temperature long-time firing, crystal growth of the phase generated in the first firing was performed. As a result, the single phase of $Li_2Na_{2-x}Ti_{6-x}Nb_xO_{14}$ having a small primary particle size and a large crystallite size had been obtained.

The powders obtained after the second firing were regarded as the products of Examples A-1 to A-9.

Example A-10

In Example A-10, a product of Example A-10 was synthesized following the same procedure as in Example A-4 except that by flowing nitrogen gas containing 3% hydrogen in the electric furnace, the firing was performed in a reducing atmosphere.

Examples A-11 to A-13

In Examples A-11 to A-13, products of Examples A-11 to A-13 were synthesized following the same procedure as in Example A-4 except that the temperature in the second firing was changed as follows.

In Example A-11, the firing temperature was changed to 700° C. to perform the second firing.

In Example A-12, the firing temperature was changed to 750° C. to perform the second firing.

In Example A-13, the firing temperature was changed to 800° C. to perform the second firing.

Example A-14

In Example A-14, a product of Example A-14 was synthesized by the following procedure, in which the surface of the product of Example A-4 was covered with lithium titanate $Li_4Ti_5O_{12}$ using a tumbling fluidized bed granulator.

More specifically, lithium ethoxide and titanium isopropoxide were mixed at a molar ratio of Li:Ti=4:5 to prepare a sol-gel liquid. This sol-gel liquid thus prepared was sprayed within the tumbling fluidized bed granulator to part of the product of Example A-4.

Thus, obtained was a composite having the sol-gel liquid adhering to the particle surface. The composite was fired at 600° C. for 2 hours in air. By this firing, the sol-gel liquid was converted into spinel lithium titanate. The product thus obtained was regarded as the product of Example A-14.

It was confirmed from the results of analyzing the product of Example A-14 by TEM-EDX (Transmission Electron Microscopy and Energy Dispersive X-ray Spectroscopy) and electron beam diffraction, that the surface of the particles of the product of Example A-4 was covered with a spinel lithium titanate $Li_4Ti_5O_{12}$ layer.

Example A-15

In Example A-15, a product of Example A-15 was synthesized by the following procedure.

First, part of the product of Example A-4 was immersed in an aqueous sucrose solution prepared at a concentration of 10 wt %. Subsequently, the residue obtained by filtration was heated at 700° C. for 2 hours in the nitrogen atmosphere. The product obtained by this heating was regarded as the product of Example A-15.

It was confirmed from the result of analyzing the product of Example A-15 by TEM-EDX, that the surface of the particles of the product of Example A-4 was covered with carbon.

The compositions of the composite oxides synthesized in Examples A-1 to A-15 are summarized in Table 1. The raw materials used in the synthesis are summarized in Table 2. As shown in Table 1, by using lithium acetate as the Li source in excess in each of Examples A-7 to A-9, the products were synthesized such that each Li amount would have a value larger than 2 in advance before the initial charge.

TABLE 1

| A series | Composition of composite oxide |
| --- | --- |
| Example A-1 | $Li_2Na_{1.95}Ti_{5.95}Nb_{0.05}O_{14}$ |
| Example A-2 | $Li_2Na_{1.9}Ti_{5.9}Nb_{0.1}O_{14}$ |
| Example A-3 | $Li_2Na_{1.75}Ti_{5.75}Nb_{0.25}O_{14}$ |
| Example A-4 | $Li_2Na_{1.5}Ti_{5.5}Nb_{0.5}O_{14}$ |
| Example A-5 | $Li_2Na_{1.25}Ti_{5.25}Nb_{0.75}O_{14}$ |
| Example A-6 | $Li_2Na_{1.1}Ti_{5.1}Nb_{0.9}O_{14}$ |
| Example A-7 | $Li_{2.1}Na_{1.5}Ti_{5.5}Nb_{0.5}O_{14}$ |
| Example A-8 | $Li_{2.5}Na_{1.5}Ti_{5.5}Nb_{0.5}O_{14}$ |
| Example A-9 | $Li_4Na_{1.5}Ti_{5.5}Nb_{0.5}O_{14}$ |
| Example A-10 | $Li_2Na_{1.5}Ti_{5.5}Nb_{0.5}O_{13.5}$ |
| Example A-11 | $Li_2Na_{1.5}Ti_{5.5}Nb_{0.5}O_{14}$ |
| Example A-12 | $Li_2Na_{1.5}Ti_{5.5}Nb_{0.5}O_{14}$ |
| Example A-13 | $Li_2Na_{1.5}Ti_{5.5}Nb_{0.5}O_{14}$ |
| Example A-14 | $Li_2Na_{1.5}Ti_{5.5}Nb_{0.5}O_{14}$ |
| Example A-15 | $Li_2Na_{1.5}Ti_{5.5}Nb_{0.5}O_{14}$ |

TABLE 2

| A series | Li source/amount | M1 source/amount | M2 source/amount | Ti source/amount |
| --- | --- | --- | --- | --- |
| Example A-1 | $CH_3COOLi \cdot 2H_2O/2.06$ | $CH_3COONa \cdot 3H_2O/1.95$ | $Nb(OCH_2CH_3)_5/0.05$ | $Ti[OCH(CH_3)_2]_4/5.95$ |
| Example A-2 | $CH_3COOLi \cdot 2H_2O/2.06$ | $CH_3COONa \cdot 3H_2O/1.9$ | $Nb(OCH_2CH_3)_5/0.1$ | $Ti[OCH(CH_3)_2]_4/5.9$ |
| Example A-3 | $CH_3COOLi \cdot 2H_2O/2.06$ | $CH_3COONa \cdot 3H_2O/1.75$ | $Nb(OCH_2CH_3)_5/0.25$ | $Ti[OCH(CH_3)_2]_4/5.75$ |
| Example A-4 | $CH_3COOLi \cdot 2H_2O/2.06$ | $CH_3COONa \cdot 3H_2O/1.5$ | $Nb(OCH_2CH_3)_5/0.5$ | $Ti[OCH(CH_3)_2]_4/5.5$ |
| Example A-5 | $CH_3COOLi \cdot 2H_2O/2.06$ | $CH_3COONa \cdot 3H_2O/1.25$ | $Nb(OCH_2CH_3)_5/0.75$ | $Ti[OCH(CH_3)_2]_4/5.25$ |
| Example A-6 | $CH_3COOLi \cdot 2H_2O/2.06$ | $CH_3COONa \cdot 3H_2O/1.1$ | $Nb(OCH_2CH_3)_5/0.9$ | $Ti[OCH(CH_3)_2]_4/5.1$ |
| Example A-7 | $CH_3COOLi \cdot 2H_2O/2.163$ | $CH_3COONa \cdot 3H_2O/1.5$ | $Nb(OCH_2CH_3)_5/0.5$ | $Ti[OCH(CH_3)_2]_4/5.5$ |
| Example A-8 | $CH_3COOLi \cdot 2H_2O/2.575$ | $CH_3COONa \cdot 3H_2O/1.5$ | $Nb(OCH_2CH_3)_5/0.5$ | $Ti[OCH(CH_3)_2]_4/5.5$ |
| Example A-9 | $CH_3COOLi \cdot 2H_2O/4.12$ | $CH_3COONa \cdot 3H_2O/1.5$ | $Nb(OCH_2CH_3)_5/0.5$ | $Ti[OCH(CH_3)_2]_4/5.5$ |
| Example A-10 | $CH_3COOLi \cdot 2H_2O/2.06$ | $CH_3COONa \cdot 3H_2O/1.5$ | $Nb(OCH_2CH_3)_5/0.5$ | $Ti[OCH(CH_3)_2]_4/5.5$ |
| Example A-11 | $CH_3COOLi \cdot 2H_2O/2.06$ | $CH_3COONa \cdot 3H_2O/1.5$ | $Nb(OCH_2CH_3)_5/0.5$ | $Ti[OCH(CH_3)_2]_4/5.5$ |
| Example A-12 | $CH_3COOLi \cdot 2H_2O/2.06$ | $CH_3COONa \cdot 3H_2O/1.5$ | $Nb(OCH_2CH_3)_5/0.5$ | $Ti[OCH(CH_3)_2]_4/5.5$ |
| Example A-13 | $CH_3COOLi \cdot 2H_2O/2.06$ | $CH_3COONa \cdot 3H_2O/1.5$ | $Nb(OCH_2CH_3)_5/0.5$ | $Ti[OCH(CH_3)_2]_4/5.5$ |

TABLE 2-continued

| A series | Li source/amount | M1 source/amount | M2 source/amount | Ti source/amount |
|---|---|---|---|---|
| Example A-14 | $CH_3COOLi \cdot 2H_2O$/2.06 | $CH_3COONa \cdot 3H_2O$/1.5 | $Nb(OCH_2CH_3)_5$/0.5 | $Ti[OCH(CH_3)_2]_4$/5.5 |
| Example A-15 | $CH_3COOLi \cdot 2H_2O$/2.06 | $CH_3COONa \cdot 3H_2O$/1.5 | $Nb(OCH_2CH_3)_5$/0.5 | $Ti[OCH(CH_3)_2]_4$/5.5 |

Examples A-16 to A-25

Composite oxides having the compositions shown in Table 3 were obtained by performing synthesis by the sol-gel method as in Examples A-1 to A-9 except that the starting materials and molar ratios shown in Table 4 were used. The powders of the composite oxides thus obtained were regarded as the products of Examples A-16 to A-25.

The compositions of the composite oxides synthesized in Examples A-16 to A-25 are summarized in Table 3. The raw materials used in synthesis are summarized in Table 4.

TABLE 3

| A series | Composition of composite oxide |
|---|---|
| Example A-16 | $Li_2Na_{1.4}K_{0.1}Ti_{5.5}Nb_{0.5}O_{14}$ |
| Example A-17 | $Li_2Na_{1.5}Ti_{5.4}Zr_{0.1}Nb_{0.5}O_{14}$ |
| Example A-18 | $Li_2Na_{1.5}Ti_{5.4}Sn_{0.1}Nb_{0.5}O_{14}$ |
| Example A-19 | $Li_2Na_{1.5}Ti_{5.6}Nb_{0.3}Mo_{0.1}O_{14}$ |
| Example A-20 | $Li_2Na_{1.5}Ti_{5.5}Nb_{0.4}V_{0.1}O_{14}$ |
| Example A-21 | $Li_2Na_{1.5}Ti_{5.3}Nb_{0.6}Fe_{0.1}O_{14}$ |
| Example A-22 | $Li_2Na_{1.5}Ti_{5.3}Nb_{0.6}Al_{0.1}O_{14}$ |
| Example A-23 | $Li_2Na_{1.5}Ti_{5.3}Nb_{0.6}Co_{0.1}O_{14}$ |
| Example A-24 | $Li_2Na_{1.5}Ti_{5.3}Mn_{0.1}Nb_{0.6}O_{14}$ |
| Example A-25 | $Li_2Na_{1.5}Ti_{5.3}Y_{0.1}Nb_{0.6}O_{14}$ |

TABLE 4

| A series | Li source/amount | M1 source/amount | M2 source/amount | Ti source/amount |
|---|---|---|---|---|
| Example A-16 | $CH_3COOLi \cdot 2H_2O$/2.06 | $CH_3COONa \cdot 3H_2O$/1.4 $CH_3COOK$/0.1 | $Nb(OCH_2CH_3)_5$/0.5 | $Ti[OCH(CH_3)_2]_4$/5.5 |
| Example A-17 | $CH_3COOLi \cdot 2H_2O$/2.06 | $CH_3COONa \cdot 3H_2O$/1.5 | $Nb(OCH_2CH_3)_5$/0.5 $Zr(OCH_2CH_3)_4$/0.1 | $Ti[OCH(CH_3)_2]_4$/5.4 |
| Example A-18 | $CH_3COOLi \cdot 2H_2O$/2.06 | $CH_3COONa \cdot 3H_2O$/1.5 | $Nb(OCH_2CH_3)_5$/0.5 $Sn(OCH_2CH_3)_4$/0.1 | $Ti[OCH(CH_3)_2]_4$/5.4 |
| Example A-19 | $CH_3COOLi \cdot 2H_2O$/2.06 | $CH_3COONa \cdot 3H_2O$/1.5 | $Nb(OCH_2CH_3)_5$/0.3 $Mo(OCH_2CH_3)_5$/0.1 | $Ti[OCH(CH_3)_2]_4$/5.6 |
| Example A-20 | $CH_3COOLi \cdot 2H_2O$/2.06 | $CH_3COONa \cdot 3H_2O$/1.5 | $Nb(OCH_2CH_3)_5$/0.4 $V(OCH_2CH_3)_4$/0.1 | $Ti[OCH(CH_3)_2]_4$/5.5 |
| Example A-21 | $CH_3COOLi \cdot 2H_2O$/2.06 | $CH_3COONa \cdot 3H_2O$/1.5 | $Nb(OCH_2CH_3)_5$/0.6 $Fe(OCH_2CH_3)_3$/0.1 | $Ti[OCH(CH_3)_2]_4$/5.3 |
| Example A-22 | $CH_3COOLi \cdot 2H_2O$/2.06 | $CH_3COONa \cdot 3H_2O$/1.5 | $Nb(OCH_2CH_3)_5$/0.6 $Al(OCH_2CH_3)_3$/0.1 | $Ti[OCH(CH_3)_2]_4$/5.3 |
| Example A-23 | $CH_3COOLi \cdot 2H_2O$/2.06 | $CH_3COONa \cdot 3H_2O$/1.5 | $Nb(OCH_2CH_3)_5$/0.6 $Co(OCH_2CH_3)_2 \cdot 4H_2O$/0.1 | $Ti[OCH(CH_3)_2]_4$/5.3 |
| Example A-24 | $CH_3COOLi \cdot 2H_2O$/2.06 | $CH_3COONa \cdot 3H_2O$/1.5 | $Nb(OCH_2CH_3)_5$/0.6 $Mn(OCH_2CH_3)_2 \cdot 4H_2O$/0.1 | $Ti[OCH(CH_3)_2]_4$/5.3 |
| Example A-25 | $CH_3COOLi \cdot 2H_2O$/2.06 | $CH_3COONa \cdot 3H_2O$/1.5 | $Nb(OCH_2CH_3)_5$/0.6 $Y(OCH_2CH_3)_3 \cdot 4H_2O$/0.1 | $Ti[OCH(CH_3)_2]_4$/5.3 |

Examples B-1 to B-6

Composite oxides having the compositions represented by the general formula $Li_2Na_{2-x}Ti_{6-x}Nb_xO_{14}$ shown in Table 5 were synthesized by the hydrothermal method.

Commercially available oxide, hydroxide, and chloride reagents were provided as starting materials such that they satisfied a predetermined molar ratio. The molar ratios of the materials are shown in Table 6. Water was filled in an autoclave at a filling ratio of 35%, and the materials were added to water such that the alkali concentration was set to 10 N. The resultant mixture was stirred. Subsequently, the autoclave containing the resultant mixture was sealed and placed in an electric furnace. The mixture was heated in the following procedure. The mixture was heated at a temperature rise rate of about 20° C./hr, reacted at 450° C. for 24 hours, and cooled. The intermediate product was suction-filtered, washed with water, and dried. The first firing was performed for the resultant mixture at a temperature of 1,000° C. for 5 min in air. In this manner, high-temperature short-time heating was performed to thus generate the primary nuclei of the $Li_2Na_{2-x}Ti_{6-x}Nb_xO_{14}$ phase having vacancies, and disperse the vacancies within the crystal structure.

The second firing was then performed for the resultant mixture at a temperature of 600° C. for 12 hours in air. Such low-temperature long-time firing allowed crystal growth of the phase generated in the heating described above. As a result, a single phase of $Li_2Na_{2-x}Ti_{6-x}Nb_xO_{14}$ having a small particle size and a large crystallite size was obtained. The powders obtained after the firing were regarded as the products of Examples B-1 to B-6.

Example B-7

In Example B-7, a product of Example B-7 was synthesized following the same procedure as in Example B-4 except that by flowing nitrogen gas containing 3% hydrogen in the electric furnace, the firing was performed in a reducing atmosphere.

Examples B-8 to B-10

In Examples B-8 to B-10, products of Examples B-8 to B-10 were synthesized following the same procedure as in Example B-4 except that the temperature in the second firing was changed as follows.

In Example B-8, the firing temperature was changed to 700° C. to perform the second firing.

In Example B-9, the firing temperature was changed to 750° C. to perform the second firing.

In Example B-10, the firing temperature was changed to 800° C. to perform the second firing.

Example B-11

In Example B-11, a product of Example B-11 was synthesized by the following procedure, in which the surface of the product in Example B-4 was covered with lithium titanate $Li_4Ti_5O_{12}$ using a tumbling fluidized bed granulator.

More specifically, lithium ethoxide and titanium isopropoxide were mixed at a molar ratio of Li:Ti=4:5 to prepare a sol-gel liquid. This sol-gel liquid thus prepared was sprayed within the tumbling fluidized bed granulator to part of the product in Example B-4.

Thus, obtained was a composite having the sol-gel liquid adhering to the particle surface. The composite was fired at 600° C. for 2 hours in air. By this firing, the sol-gel liquid was converted into spinel lithium titanate. The product thus obtained was regarded as the product of Example B-11.

It was confirmed from the result of analyzing the product of Example B-11 by TEM-EDX (Transmission Electron Microscopy and Energy Dispersive X-ray Spectroscopy) and electron beam diffraction, that the surface of the particles of the product of Example B-4 was covered with a spinel lithium titanate $Li_4Ti_5O_{12}$ layer.

Example B-12

In Example B-12, a product of Example B-12 was synthesized by the following procedure.

First, part of the product in Example B-4 was immersed in an aqueous sucrose solution prepared at a concentration of 10 wt %. Subsequently, the residue obtained by filtration was heated at 700° C. for 2 hours in the nitrogen atmosphere. The product obtained by this heating was regarded as the product of Example B-12.

It was confirmed from the result of analyzing the product of Example B-12 by TEM-EDX, the surface of the particles of the product of Example B-4 was covered with carbon.

The compositions of the composite oxides synthesized in Examples B-1 to B-12 are summarized in Table 5. The raw materials used in the synthesis are summarized in Table 6.

TABLE 5

| B series | Composition of composite oxide |
| --- | --- |
| Example B-1 | $Li_2Na_{1.95}Ti_{5.95}Nb_{0.05}O_{14}$ |
| Example B-2 | $Li_2Na_{1.9}Ti_{5.9}Nb_{0.1}O_{14}$ |
| Example B-3 | $Li_2Na_{1.75}Ti_{5.75}Nb_{0.25}O_{14}$ |
| Example B-4 | $Li_2Na_{1.5}Ti_{5.5}Nb_{0.5}O_{14}$ |
| Example B-5 | $Li_2Na_{1.25}Ti_{5.25}Nb_{0.75}O_{14}$ |
| Example B-6 | $Li_2Na_{1.1}Ti_{5.1}Nb_{0.9}O_{14}$ |
| Example B-7 | $Li_2Na_{1.5}Ti_{5.5}Nb_{0.5}O_{13.5}$ |
| Example B-8 | $Li_2Na_{1.5}Ti_{5.5}Nb_{0.5}O_{14}$ |
| Example B-9 | $Li_2Na_{1.5}Ti_{5.5}Nb_{0.5}O_{14}$ |
| Example B-10 | $Li_2Na_{1.5}Ti_{5.5}Nb_{0.5}O_{14}$ |
| Example B-11 | $Li_2Na_{1.5}Ti_{5.5}Nb_{0.5}O_{14}$ |
| Example B-12 | $Li_2Na_{1.5}Ti_{5.5}Nb_{0.5}O_{14}$ |

TABLE 6

| B series | Li source/amount | M1 source/amount | M2 source/amount | Ti source/amount |
| --- | --- | --- | --- | --- |
| Example B-1 | LiOH/2.06 | NaOH/1.95 | $NbCl_5$/0.05 | $TiO_2$/5.95 |
| Example B-2 | LiOH/2.06 | NaOH/1.9 | $NbCl_5$/0.1 | $TiO_2$/5.9 |
| Example B-3 | LiOH/2.06 | NaOH/1.75 | $NbCl_5$/0.25 | $TiO_2$/5.75 |
| Example B-4 | LiOH/2.06 | NaOH/1.5 | $NbCl_5$/0.5 | $TiO_2$/5.5 |
| Example B-5 | LiOH/2.06 | NaOH/1.25 | $NbCl_5$/0.75 | $TiO_2$/5.25 |
| Example B-6 | LiOH/2.06 | NaOH/1.1 | $NbCl_5$/0.9 | $TiO_2$/5.1 |
| Example B-7 | LiOH/2.06 | NaOH/1.5 | $NbCl_5$/0.5 | $TiO_2$/5.5 |
| Example B-8 | LiOH/2.06 | NaOH/1.5 | $NbCl_5$/0.5 | $TiO_2$/5.5 |
| Example B-9 | LiOH/2.06 | NaOH/1.5 | $NbCl_5$/0.5 | $TiO_2$/5.5 |
| Example B-10 | LiOH/2.06 | NaOH/1.5 | $NbCl_5$/0.5 | $TiO_2$/5.5 |
| Example B-11 | LiOH/2.06 | NaOH/1.5 | $NbCl_5$/0.5 | $TiO_2$/5.5 |
| Example B-12 | LiOH/2.06 | NaOH/1.5 | $NbCl_5$/0.5 | $TiO_2$/5.5 |

Comparative Example A-1

In Comparative Example A-1, the composite oxide $Li_2Na_{1.5}Nb_{0.5}Ti_{5.5}O_{14}$ was synthesized by a solid phase method.

First, commercially available oxide and carbonate reagents shown in the following Table 8 were provided as starting materials so that molar ratios shown in Table 8 were satisfied and the total weight was 50 g. As a result of analyzing the vaporized amount of lithium ions during firing in a preliminary experiment, since the vaporized amount corresponding to 3% in terms of amount of lithium carbonate was confirmed, lithium carbonate was provided in 3% excess relative to the target composition.

Next, the starting materials, provided as above, were mixed, and the mixture was put in an agate pod (a volume of 300 ml) for ball mill. Agate balls having diameters of 10 mm and 5 mm were put into the pod in a number ratio of 1:1, filling up to one third of the pod volume. After that, 50 ml of ethanol was added to the pod, and the mixture was wet-mixed at 120 rpm for 60 minutes to obtain a mixture.

Next, the thus obtained mixture was put in an electric furnace, and a heat treatment was performed by the following procedures.

First, pre-firing was performed at a temperature of 650° C. for 6 hours in air. Next, a powder obtained by pre-firing was taken out from the furnace, and the powder was reground and mixed.

The thus obtained mixture was subsequently subjected to a first firing at a temperature of 900° C. for 6 hours. After the firing, the fired powder was taken out from the furnace, and the fired powder was re-mixed.

Subsequently, the re-mixed fired powder was put in the furnace, and a second firing was performed at a temperature of 900° C. for 6 hours in an air atmosphere. After that, the temperature in the electric furnace was maintained at 400° C. for 2 hours, and then was quickly cooled to room temperature. Next, the fired powder was taken out from the furnace, and the fired powder was re-mixed.

The powder obtained after the second firing, i.e., as a result of firing at 900° C. for a total of 12 hours was regarded as the product of Comparative Example A-1.

Comparative Example A-2

In Comparative Example A-2, a composite oxide in Comparative Example A-2 was synthesized following the same procedure as in Comparative Example A-1 except that the sample obtained after the second firing was ground again by performing wet-mixing using a ball mill under the above conditions.

The compositions of the composite oxides synthesized in Comparative Examples A-1 and A-2 are summarized in Table 7. The raw materials used in synthesis are summarized Table 8.

TABLE 7

| A series | Composition of composite oxide |
|---|---|
| Comparative Example A-1 | $Li_2Na_{1.5}Ti_{5.5}Nb_{0.5}O_{14}$ |
| Comparative Example A-2 | $Li_2Na_{1.5}Ti_{5.5}Nb_{0.5}O_{14}$ |

TABLE 8

| A series | Li source/ amount | M1 source/ amount | M2 source/ amount | Ti source/ amount |
|---|---|---|---|---|
| Comparative Example A-1 | $Li_2CO_3$/1.03 | $Na_2CO_3$/0.75 | $Nb_2O_5$/0.25 | $TiO_2$/5.5 |
| Comparative Example A-2 | $Li_2CO_3$/1.03 | $Na_2CO_3$/0.75 | $Nb_2O_5$/0.25 | $TiO_2$/5.5 | the electric furnace and the first firing was performed at a temperature of 400° C. for 3 hours in air. The mixture thus obtained was ground and mixed, and then the second firing was performed at a temperature of 600° C. for 12 hours in air. The obtained resultant powders were respectively regarded as the products of Comparative Examples B-1 and B-2.

Note that it is difficult to synthesize the target composite oxide having vacancies by such a sol-gel method using low-temperature firing of 800° C. or less, and a single phase could not be obtained.

Comparative Example B-3

In Comparative Example B-3, a product of Comparative Example 3 was synthesized following the same procedure as in Comparative Example 1 except that the second firing temperature was changed to 700° C.

The compositions of the composite oxides synthesized in Comparative Examples B-1 to B-3 are summarized in Table 9, and the materials used in synthesis are summarized in Table 10.

TABLE 9

| B series | Composition of composite oxide |
|---|---|
| Comparative Example B-1 | $Li_2Na_{1.5}Ti_{5.5}Nb_{0.5}O_{14}$ |
| Comparative Example B-2 | $Li_2Na_{1.5}Ti_{5.5}Nb_{0.5}O_{14}$ |
| Comparative Example B-3 | $Li_2Na_{1.5}Ti_{5.5}Nb_{0.5}O_{14}$ |

TABLE 10

| B series | Li source/amount | M1 source/amount | M2 source/amount | Ti source/amount |
|---|---|---|---|---|
| Comparative Example B-1 | $CH_3COOLi \cdot 2H_2O$/2.06 | $CH_3COONa \cdot 3H_2O$/1.5 | $Nb(OCH_2CH_3)_5$/0.5 | $Ti[OCH(CH_3)_2]_4$/5.5 |
| Comparative Example B-2 | $CH_3COOLi \cdot 2H_2O$/2.06 | $CH_3COONa \cdot 3H_2O$/1.5 | $NbCl_5$/0.5 | $Ti[OCH(CH_3)_2]_4$/5.5 |
| Comparative Example B-3 | $CH_3COOLi \cdot 2H_2O$/2.06 | $CH_3COONa \cdot 3H_2O$/1.5 | $Nb(OCH_2CH_3)_5$/0.5 | $Ti[OCH(CH_3)_2]_4$/5.5 |

Comparative Examples B-1 and B-2

Composite oxides represented by the general formula $Li_{2+w}Na_{2-x}Ti_{6-z}M2_zO_{14+\delta}$ having vacancies in Na sites were attempted to be synthesized by performing only low-temperature firing in the sol-gel method.

Commercially available acetate, chloride, and metal ethoxide reagents were provided as starting materials such that they satisfied a predetermined molar ratio and the total weight was 10 g. The molar ratios of the materials are shown in Table 10. In a preliminary experiment, when the vaporized amount of lithium ions during firing was analyzed, since the vaporized amount corresponding to 3% in terms of amount of lithium acetate was confirmed, lithium acetate was provided in 3% excess relative to the target composition.

Subsequently, the acetate and chloride were dissolved in 10 mL of a solution mixture of ethanol and acetic acid (ethanol:aceticacid=3:5 in weight ratio), an ethoxide reagent was then added dropwise into the mixture, and mixing and heating were performed to produce a dry-gel.

The dry-gel thus obtained was placed in the electric furnace, and heating was performed in the following procedure. First of all, the sample (the dry-gel) was placed in Comparative Example C-1

In Comparative Example C-1, the composite oxide $Li_4Ti_5O_{12}$ was synthesized by the sol-gel method.

Commercially available acetate, and metal ethoxide reagents were provided as starting materials such that they satisfied a predetermined molar ratio and the total weight was 10 g. The molar ratios of the materials are shown in Table 12. In a preliminary experiment, when the vaporized amount of lithium ions during firing was analyzed, since the vaporized amount corresponding to 3% in terms of amount of lithium acetate was confirmed, lithium acetate was provided in 3% excess relative to the target composition.

Subsequently, the acetate was dissolved in 10 mL of a solution mixture of ethanol and acetic acid (ethanol:acetic acid=3:5 in weight ratio), an ethoxide reagent was then added dropwise into the mixture, and mixing and heating were performed to produce a dry-gel.

The dry-gel thus obtained was placed in the electric furnace, and heating was performed in the following procedure.

First of all, the sample (the dry-gel) was placed in the electric furnace and the first firing was performed at a temperature of 250° C. for 6 hours in air.

The mixture thus obtained was ground and mixed, and then the second firing was performed at a temperature of 700° C. for 5 hours in the atmosphere.

The resultant powder obtained after the second firing was regarded as the product of Comparative Example C-1.

Comparative Example C-2

In Comparative Example C-2, a niobium-titanium composite oxide having a composition shown in Table 11 was synthesized following the same procedure as in Comparative Example C-1 except that the starting materials and the molar ratio shown in Table 12 was adopted, and the firing temperature was set to 800° C. The obtained niobium-titanium composite oxide was regarded as the product of Comparative Example C-2.

Comparative Example C-3

In Comparative Example C-3, monoclinic titanium dioxide (so-called $TiO_2(B)$) was synthesized. First, the starting materials shown in Table 12 were provided to satisfy a predetermined molar ratio and have a total weight of 10 g. Subsequently, the starting materials were mixed, and the mixture was fired at a temperature of 400° C. for 10 hours in air. $K_2Ti_6O_{17}$ thus obtained was ground and mixed in a ball mill. The materials were ground and mixed by rotating zirconia balls each having a diameter of 10 mm at the rotational speed of 1,000 rpm for 2 hours in a 100 cm$^2$ container.

After that, proton exchange was performed by an acid treatment. First, the obtained mixture was washed with distilled water to remove impurities. The acid treatment was then performed to exchange the alkali cations (K$^+$) of the alkali titanate compound ($K_2Ti_6O_{17}$) into protons, thereby obtaining a proton titanate compound. The acid treatment was performed by adding an acid to the alkali titanate compound powder and stirring. The acid used was 1 M nitric acid, and the acid treatment was performed at 25° C. for one week. The proton titanate compound obtained after completion of the proton exchange was washed with distilled water and dried. Note that the proton titanate compound was sufficiently washed with water until the pH of the wash water had fallen within the range of 6 to 8.

The proton titanate compound was then heated. First, the first heating was performed at a temperature of 400° C. for 3 hours. The obtained oxide of titanium was then subjected to the second heating. The second heating was performed at a temperature of 200° C. for one week. Monoclinic titanium oxide ($TiO_2(B)$) synthesized by the above method was regarded as the product of Comparative Example C-3.

The compositions of the composite oxides synthesized in Comparative Examples C-1 to C-3 are summarized in Table 11. The raw materials used in synthesis are summarized in Table 12.

TABLE 11

| C series | Composition of oxide |
| --- | --- |
| Comparative Example C-1 | $Li_4Ti_5O_{12}$ |
| Comparative Example C-2 | $TiNb_2O_7$ |
| Comparative Example C-3 | $TiO_2$ |

TABLE 12

| C series | Li source/amount | M1 source/amount | M2 source/amount | Ti source/amount |
| --- | --- | --- | --- | --- |
| Comparative Example C-1 | $CH_3COOLi \cdot 2H_2O$/2.03 | — | — | $Ti[OCH(CH_3)_2]_4$/5.0 |
| Comparative Example C-2 | — | — | $Nb(OCH_2CH_3)_5$/2.0 | $Ti[OCH(CH_3)_2]_4$/1.0 |
| Comparative Example C-3 | — | KOH/2.06 | — | $TiO_2$/3.0 |

(SEM Observation)

The products of Examples A-1 to A-25, Examples B-1 to B-12, Comparative Examples A-1 and A-2, and Comparative Examples C-1 to C-3 were subjected to SEM-observation following the procedure described above. The average primary particle sizes of the resultant products are shown in Tables 13 to 16 and 18.

In Comparative Examples B-1 to B-3, a single phase could not be obtained, and therefore, the particle of each product could not be specified.

TABLE 13

| A series | Average primary particle size (nm) | Average crystallite size (nm) | Crystallite size/ primary particle size (nm/nm) | Crystal phase | Space group |
| --- | --- | --- | --- | --- | --- |
| Example A-1 | 126 | 57.8 | 0.459 | orthorhombic | Fmmm |
| Example A-2 | 119 | 55.3 | 0.465 | orthorhombic | Fmmm |
| Example A-3 | 121 | 58.3 | 0.482 | orthorhombic | Fmmm |
| Example A-4 | 124 | 56.9 | 0.459 | orthorhombic | Fmmm |
| Example A-5 | 122 | 57.4 | 0.470 | orthorhombic | Fmmm |
| Example A-6 | 120 | 54.3 | 0.453 | orthorhombic | Fmmm |
| Example A-7 | 126 | 53.1 | 0.421 | orthorhombic | Fmmm |
| Example A-8 | 134 | 53.4 | 0.399 | orthorhombic | Fmmm |
| Example A-9 | 132 | 53.8 | 0.408 | orthorhombic | Fmmm |

TABLE 13-continued

| A series | Average primary particle size (nm) | Average crystallite size (nm) | Crystallite size/ primary particle size (nm/nm) | Crystal phase | Space group |
|---|---|---|---|---|---|
| Example A-10 | 123 | 52.4 | 0.426 | orthorhombic | Fmmm |
| Example A-11 | 201 | 76.7 | 0.382 | orthorhombic | Fmmm |
| Example A-12 | 371 | 82.5 | 0.222 | orthorhombic | Fmmm |
| Example A-13 | 602 | 87 | 0.145 | orthorhombic | Fmmm |
| Example A-14 | 124 | 56.9 | 0.459 | orthorhombic | Fmmm |
| Example A-15 | 124 | 56.9 | 0.459 | orthorhombic | Fmmm |

TABLE 14

| A series | Average primary particle size (nm) | Average crystallite size (nm) | Crystallite size/ primary particle size (nm/nm) | Crystal phase | Space group |
|---|---|---|---|---|---|
| Example A-16 | 123 | 58.2 | 0.473 | orthorhombic | Fmmm |
| Example A-17 | 127 | 56.9 | 0.448 | orthorhombic | Fmmm |
| Example A-18 | 135 | 58.3 | 0.432 | orthorhombic | Fmmm |
| Example A-19 | 145 | 60.3 | 0.416 | orthorhombic | Fmmm |
| Example A-20 | 125 | 59.2 | 0.474 | orthorhombic | Fmmm |
| Example A-21 | 131 | 57.2 | 0.437 | orthorhombic | Fmmm |
| Example A-22 | 122 | 56.4 | 0.462 | orthorhombic | Fmmm |
| Example A-23 | 124 | 58.3 | 0.470 | orthorhombic | Fmmm |
| Example A-24 | 121 | 55.8 | 0.461 | orthorhombic | Fmmm |
| Example A-25 | 130 | 56.5 | 0.435 | orthorhombic | Fmmm |

TABLE 15

| B series | Average primary particle size (nm) | Average crystallite size (nm) | Crystallite size/ primary particle size (nm/nm) | Crystal phase | Space group |
|---|---|---|---|---|---|
| Example B-1 | 113 | 61.1 | 0.541 | orthorhombic | Fmmm |
| Example B-2 | 121 | 60.1 | 0.497 | orthorhombic | Fmmm |
| Example B-3 | 118 | 59.8 | 0.507 | orthorhombic | Fmmm |
| Example B-4 | 116 | 58.9 | 0.508 | orthorhombic | Fmmm |
| Example B-5 | 117 | 59.4 | 0.508 | orthorhombic | Fmmm |
| Example B-6 | 120 | 59.8 | 0.498 | orthorhombic | Fmmm |
| Example B-7 | 114 | 57.6 | 0.505 | orthorhombic | Fmmm |
| Example B-8 | 197 | 78.4 | 0.398 | orthorhombic | Fmmm |
| Example B-9 | 368 | 87.6 | 0.238 | orthorhombic | Fmmm |
| Example B-10 | 591 | 89.7 | 0.152 | orthorhombic | Fmmm |
| Example B-11 | 116 | 58.9 | 0.508 | orthorhombic | Fmmm |
| Example B-12 | 116 | 58.9 | 0.508 | orthorhombic | Fmmm |

TABLE 16

| A series | Average primary particle size (nm) | Average crystallite size (nm) | Crystallite size/ primary particle size (nm/nm) | Crystal phase | Space group |
|---|---|---|---|---|---|
| Comparative Example A-1 | 1905 | 102 | 0.054 | orthorhombic | Fmmm |
| Comparative Example A-2 | 1568 | 89 | 0.057 | orthorhombic | Fmmm |

TABLE 17

| B series | Average primary particle size (nm) | Average crystallite size (nm) | Crystallite size/ primary particle size (nm/nm) | Crystal phase | Space group |
|---|---|---|---|---|---|
| Comparative Example B-1 | Singular phase not obtained | Singular phase not obtained | — | — | — |
| Comparative Example B-2 | Singular phase not obtained | Singular phase not obtained | — | — | — |
| Comparative Example B-3 | Singular phase not obtained | Singular phase not obtained | — | — | — |

TABLE 18

| C series | Average primary particle size (nm) | Average crystallite size (nm) | Crystallite size/ primary particle size (nm/nm) | Crystal phase | Space group |
| --- | --- | --- | --- | --- | --- |
| Comparative Example C-1 | 212 | 92 | 0.434 | cubic | Fd-3m |
| Comparative Example C-2 | 243 | 96 | 0.395 | monoclinic | C2/m |
| Comparative Example C-3 | 236 | 81 | 0.343 | monoclinic | C2/m |

As apparent from the comparison between Examples A-1 to A-25 shown in Tables 13 and 14 and Comparative Examples A-1 and A-2 shown in Table 16, the average primary particle sizes of the products synthesized using the sol-gel method in Examples A-1 to A-25 were smaller than those of the products obtained by the solid phase synthesis in Comparative Examples A-1 and A-2.

Accordingly, it can be seen that as in Examples A-1 to A-26, the elements are dispersed uniformly on the atomic level by using the sol-gel synthesis for the production of primary nuclei of the composite oxide phase, and thus allows the subsequent firing (second firing) to be performed at low temperatures, whereby high crystallinity can be obtained while the primary particle size is kept small. As a result, as shown in Tables 13 and 14, in all of Examples A-1 to A-25, composite oxide particles satisfying the average primary particle size of 0.1 μm to 0.6 μm and the average crystallite size of 50 nm to 90 nm had been obtained.

As shown in Table 15, average primary particle sizes comparable to those in Examples A-1 to A-25 could be obtained for the products of Examples B-1 to B-12 in which the primary nuclei of the composite oxide phase were produced by the hydrothermal synthesis method in place of the sol-gel method. In Examples B-1 to B-12, composite oxide particles satisfying the average primary particle size of 0.1 μm to 0.6 μm and the average crystallite size of 50 nm to 90 nm had been obtained.

On the other hand, in Comparative Examples A-1 and A-2, particles having an average primary particle size exceeding 1 μm were obtained. For the products in Comparative Examples A-1 and A-2, although a large crystallite size could be obtained as a whole, the ratio (crystallite size/primary particle size) of the crystallite size to the average primary particle size was low.

(XRD Measurement)

Powder X-ray diffraction measurement was performed for the products of Examples A-1 to A-25, Examples B-1 to B-12, Comparative Examples A-1 and A-2, and Comparative Examples C-1 to C-3 by the procedure as described above.

The results obtained by analyzing the crystallite sizes of each of the obtained products from the powder X-ray diffraction result are shown in Tables 13 to 16 and 18.

Note that since single phases could not be obtained for Comparative Example B-1 to B-3, as described above, appropriate X-ray diffraction patterns for the analysis of the crystallite sizes could not be obtained.

As apparent from the comparison between Examples A-1 to A-25 shown in Tables 13 and 14 and Comparative Examples A-1 and A-2 shown in Table 16, the products obtained by the sol-gel method in Examples A-1 to A-25 tend to have higher crystallite size ratios (crystallite size/primary particle size) with respect to the average primary particle size than those of the products obtained by the solid phase synthesis in Comparative Examples A-1 and A-2. It can thus be seen that by virtue of uniform dispersion of the atoms due to the use of the sol-gel method, a larger crystallite size had been obtained as compared with the use of the solid phase method.

It was found from the result obtained by analyzing the powder X-ray diffraction result by the Rietveld method, that the products obtained in Examples A-1 to A-25, Examples B-1 to B-12, and Comparative Examples A-1 and A-2 were orthorhombic compounds having the symmetry of the space group Fmmm shown in FIG. 2. The crystal phases and the space groups of the respective products are summarized in Tables 13 to 16. The crystal phases and the space groups of the products in Comparative Examples C-1 to C-3 are shown in Table 18. Note that as shown in Table 17, a single phase was not obtained in Comparative Examples B-1 to B-3, and an X-ray diffraction pattern appropriate for Rietveld analysis was not obtained.

FIG. 12 shows the X-ray diffraction diagrams of Examples A-4, A-11, and A-13 and Comparative Example A-2 as typical X-ray diffraction diagrams.

(Electrochemical Measurement)

Each of the products obtained in Examples and Comparative Examples described above was subjected to an electrochemical measurement according to the following procedures. Although the following explanation is made using the product of Example A-1 as an example, the electrochemical measurement of the products of other Examples and Comparative Examples were performed in the same manner as for the product of Example A-1.

First, the particles of the product of Example A-1 were ground to obtain a ground product having an average particle size of 5 μm or less. Next, acetylene black, as an electro-conductive agent, was mixed with the ground product in a proportion of 10 parts by mass relative to the ground product to obtain a mixture. Next, the mixture was dispersed in NMP (N-methyl-2-pyrrolidone) to obtain a dispersion. Polyvinylidene fluoride (PVdF), as a binder, was mixed with the dispersion in a proportion of 10 parts by mass relative to the product of the Example to obtain an electrode slurry. This slurry was applied using a blade onto a current collector, formed of an aluminum foil. This was dried at 130° C. for 12 hours under vacuum, and then rolled so that the density of an electrode layer (excluding the current collector) was 2.2 g/cm$^3$ to obtain an electrode.

Using this electrode, a metal lithium foil as a counter electrode, and a nonaqueous electrolyte, an electrochemical measurement cell of the Example was produced. As the nonaqueous electrolyte, a mixture in which lithium hexafluorophosphate (LiPF$_6$) was dissolved in a concentration of 1 M in a mixed solvent of ethylene carbonate and diethyl carbonate (volume ratio of 1:1) was used.

The electrochemical measurement cell of the Example was subjected to a charge-and-discharge test at room temperature. The charge-and-discharge test was performed within a potential range of 1.2 V to 3.0 V (vs. Li/Li$^+$) with a metal lithium electrode as standard, at a charge and discharge current value of 0.2 C (hourly discharge rate). In this test, a first Li insertion amount was defined as an initial charge capacity, and a first Li extraction amount was defined as an initial discharge capacity.

The 10 C/0.2 C discharge capacity ratios (%) of the electrochemical cells of the Examples and Comparative Examples were calculated from the measurement results of the 0.2 C discharge capacity and the 10.0 C discharge capacity obtained by the above charge-and-discharge test. The calculation results are summarized in Tables 19 to 24 below.

When the results in Examples A-1 to A-25 and Examples B-1 to B-12 are compared with the results in Comparative Examples A-1 and A-2, it can be seen that in active materials having a small particle size and a large crystallite size, dispersion distances in the solids are reduced, and at the same time the dispersion resistances in the solids are reduced, and therefore, a large capacity is exhibited even at a high rate, which is why the 10 C/0.2 C discharge capacity ratio (rate capacity retention ratio) is high. Accordingly, it is found that by reducing the primary particle size of an active material, the lithium ion dispersion distance in the active material becomes reduced, making it possible to improve the input-output performance as a battery. It can also be recognized that by virtue of having high crystallinity regardless of a small primary particle size, the grain boundary and distortion of the primary particle are reduced, and lithium ion dispersion within the active material can be facilitated.

The 10 C/0.2 C voltage ratios (multiplication factor) at SOC 10% were calculated. The calculation results are shown in Tables 19 to 24.

As described above, for each of Comparative Examples B-1 to B-3, a single phase was not obtained, and a large amount of impurity phase exists. For this reason, it was difficult to determine the amount of compound as an active material, and therefore, the charge-and-discharge capacity of these compounds could not be accurately determined. Due to this reason, as shown in Table 23, the electrochemical measurement results in Comparative Examples B-1 to B-3 could not be obtained.

TABLE 19

| A series | 10 C/0.2 C discharge capacity ratio (%) | 10 C/0.2 C voltage difference at SOC 10% (multiplication factor) |
| --- | --- | --- |
| Example A-1 | 94.83 | 1.079 |
| Example A-2 | 93.54 | 1.076 |
| Example A-3 | 94.15 | 1.084 |
| Example A-4 | 94.40 | 1.078 |
| Example A-5 | 94.40 | 1.081 |
| Example A-6 | 94.23 | 1.081 |
| Example A-7 | 91.54 | 1.084 |
| Example A-8 | 90.21 | 1.086 |
| Example A-9 | 90.13 | 1.089 |
| Example A-10 | 93.26 | 1.075 |
| Example A-11 | 94.67 | 1.093 |
| Example A-12 | 93.45 | 1.104 |
| Example A-13 | 90.24 | 1.109 |
| Example A-14 | 94.44 | 1.079 |
| Example A-15 | 94.86 | 1.071 |

TABLE 20

| A series | 10 C/0.2 C discharge capacity ratio (%) | 10 C/0.2 C voltage difference at SOC 10% (multiplication factor) |
| --- | --- | --- |
| Example A-16 | 93.50 | 1.082 |
| Example A-17 | 93.87 | 1.073 |
| Example A-18 | 94.21 | 1.081 |
| Example A-19 | 94.53 | 1.085 |
| Example A-20 | 94.38 | 1.082 |
| Example A-21 | 94.56 | 1.082 |
| Example A-22 | 94.31 | 1.072 |
| Example A-23 | 94.33 | 1.079 |
| Example A-24 | 93.21 | 1.088 |
| Example A-25 | 94.62 | 1.074 |

TABLE 21

| B series | 10 C/0.2 C discharge capacity ratio (%) | 10 C/0.2 C voltage difference at SOC 10% (multiplication factor) |
| --- | --- | --- |
| Example B-1 | 94.86 | 1.078 |
| Example B-2 | 94.49 | 1.081 |
| Example B-3 | 94.52 | 1.072 |
| Example B-4 | 94.57 | 1.075 |
| Example B-5 | 94.61 | 1.073 |
| Example B-6 | 94.32 | 1.080 |
| Example B-7 | 94.47 | 1.071 |
| Example B-8 | 94.72 | 1.092 |
| Example B-9 | 93.91 | 1.107 |
| Example B-10 | 92.11 | 1.112 |
| Example B-11 | 94.53 | 1.076 |
| Example B-12 | 95.71 | 1.068 |

TABLE 22

| A series | 10 C/0.2 C discharge capacity ratio (%) | 10 C/0.2 C voltage difference at SOC 10% (multiplication factor) |
| --- | --- | --- |
| Comparative Example A-1 | 82.13 | 1.176 |
| Comparative Example A-2 | 84.42 | 1.141 |

TABLE 23

| B series | 10 C/0.2 C discharge capacity ratio (%) | 10 C/0.2 C voltage difference at SOC 10% (multiplication factor) |
| --- | --- | --- |
| Comparative Example B-1 | unmeasurable | unmeasurable |
| Comparative Example B-2 | unmeasurable | unmeasurable |
| Comparative Example B-3 | unmeasurable | unmeasurable |

TABLE 24

| C series | 10 C/0.2 C discharge capacity ratio (%) | 10 C/0.2 C voltage difference at SOC 10% (multiplication factor) |
| --- | --- | --- |
| Comparative Example C-1 | 71.6 | 1.098 |

TABLE 24-continued

| C series | 10 C/0.2 C discharge capacity ratio (%) | 10 C/0.2 C voltage difference at SOC 10% (multiplication factor) |
|---|---|---|
| Comparative Example C-2 | 81.5 | 1.223 |
| Comparative Example C-3 | 83.6 | 1.234 |

When the results in Examples A-1 to A-25 and Examples B-1 to B-12 are compared with the results in Comparative Examples A-1 and A-2, it can be seen that by the reduction of the particle size of each active material, the contact area between the active material and the electrolyte increases and facilitates the desolvation reaction, and thereby, the 10 C/0.2 C voltage ratio (overvoltage in beginning period of discharge) at SOC 10% exhibits a small value.

When the results in Examples A-1 to A-25 and Examples B-1 to B-12 are compared with the results in Comparative Examples C-1 to C-3, it can be seen that when particles having a particle size and a crystallite size which are about equal to each other are used, more excellent output performance can be obtained using particles of a composite oxide having an orthorhombic crystal structure and represented by the general formula $Li_{2+w}Na_{2-x}M1_yTi_{6-z}M2_zO_{14+\delta}$, as compared with a case in which other compounds are used as an active material.

By using the above active material in a battery, the output of the battery itself can be improved.

Figure 13:
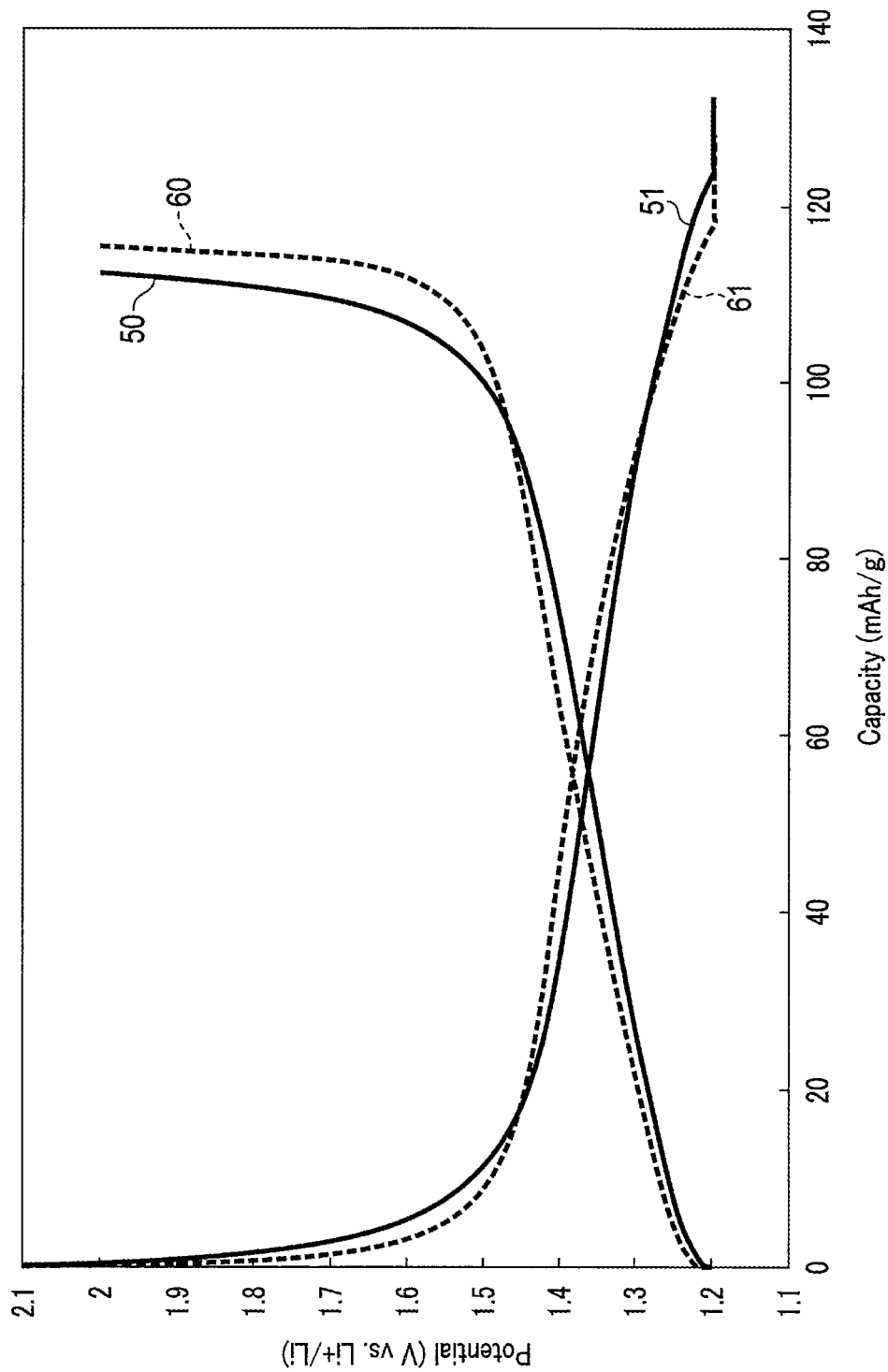
FIG. 13 is a graph showing initial charge and discharge curves obtained in an electrochemical measurement of electrochemical cells of Example A-4 and Comparative Example A-4.

The initial charge and discharge curves obtained by the electrochemical measurements of the electrochemical cells in Example A-4 and Comparative Example A-4 are shown in FIG. 13. Referring to FIG. 13, charge and discharge curves (charge curve 51 and discharge curve 50) indicated by solid lines indicate a change in potential of an electrode containing the product (orthorhombic composite oxide) of Example A-4. Charge-and-discharge curves (charge curve 61 and discharge curve 60) indicated by broken lines indicate a change in potential of an electrode containing the product (orthorhombic composite oxide) of Comparative Example A-4.

Figure 14:
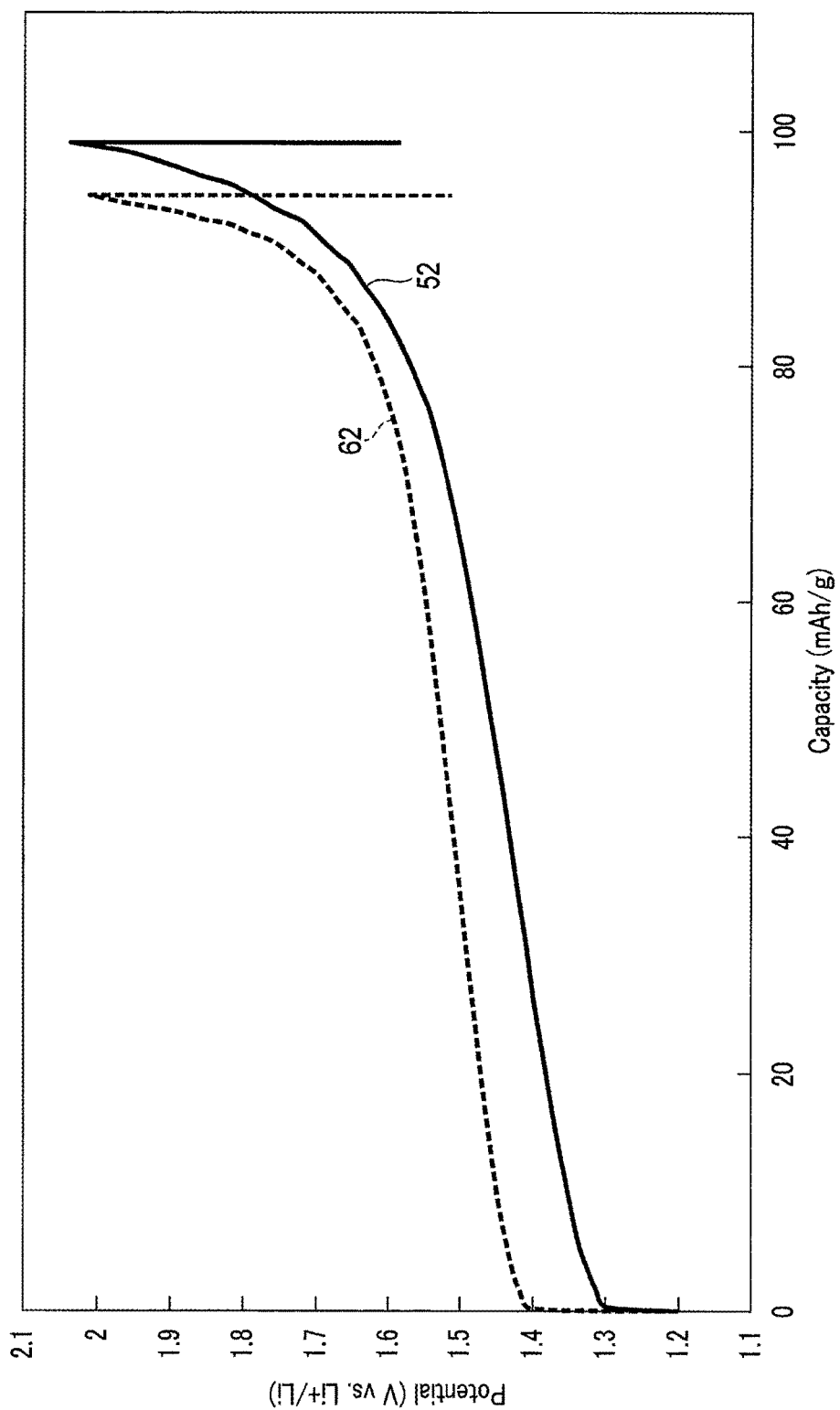
FIG. 14 is a graph showing discharge curves at 10 C rate obtained in an electrochemical measurement of electrochemical cells of Example A-1 and Comparative Example A-4.

10 C discharge rate curves obtained by the electrochemical measurements of the electrochemical cells in Example A-4 and Comparative Example A-4 are shown in FIG. 14. A discharge curve 52 indicated by a solid line corresponds to the electrochemical cell in Example A-4, while a discharge curve 62 indicated by a broken line corresponds to the electrochemical cell in Comparative Example A-4.

From comparison of behaviors between Example A-4 and Comparative Example A-4 at the time of discharge, it can be seen that when a composite oxide synthesized by the sol-gel method is used, the change in potential in the beginning period of discharge is smaller while the capacity at a high rate increases, as compared with a case in which a composite oxide obtained by the solid phase synthesis is used. This indicates that the lithium ion dispersion properties has improved in the electrode using the composite oxide synthesized by the sol-gel method relative to that in the electrode using the composite oxide synthesized by the solid phase method.

Example E

In Example E, a nonaqueous electrolyte battery was produced according to the following procedures.

(Production of Negative Electrode)

First, particles of the product of Example A-1 were ground so that the average particle size was 5 μm or less to obtain a ground product. Next, acetylene black, as an electro-conductive agent, was mixed with the active material in a proportion of 6 parts by mass relative to the product to obtain a mixture. Next, the mixture was dispersed in NMP (N-methyl-2-pyrrolidone) to obtain a dispersion. Polyvinylidene fluoride (PVdF), as a binder, was mixed with the dispersion in proportion of 10 parts by mass relative to the product of Example A-5 to prepare a negative electrode slurry. This slurry was applied using a blade onto a current collector, formed of aluminum foil. After the obtained product was dried at 130° C. for 12 hours in vacuum, it was roll-pressed so that a density of the electrode active material-containing layer (excluding the current collector) was 2.2 g/cm³ to obtain a negative electrode.

(Production of Positive Electrode)

With a commercially available spinel lithium manganese oxide ($LiMn_2O_4$) was mixed 5 parts by weight of acetylene black as an electro-conductive agent to obtain a mixture. Next, the mixture was dispersed in NMP to obtain a dispersion. To the dispersion was mixed PVdF, as a binder, in a proportion of 5 parts by weight relative to the lithium manganese oxide to prepare a positive electrode slurry. This slurry was applied using a blade onto a current collector, formed of an aluminum foil. After the obtained product was dried at 130° C. for 12 hours in vacuum, it was roll-pressed so that a density of the electrode active material-containing layer (excluding the current collector) was 2.1 g/cm³, to obtain a positive electrode.

(Production of Electrode Group)

The positive electrode and the negative electrode produced as described above were stacked with a polyethylene separator sandwiched therebetween to obtain a stack. Next, this stack was wound and pressed to obtain a flat-shaped wound electrode group. A positive electrode terminal and a negative electrode terminal were connected to this electrode group.

(Preparation of Nonaqueous Electrolyte)

As a mixed solvent, a mixed solvent of ethylene carbonate and diethyl carbonate (volume ratio of 1:1) was provided. Lithium hexafluorophosphate ($LiPF_6$) was dissolved in this solvent in a concentration of 1 M. Thus, a nonaqueous electrolyte was prepared.

(Assembly of Nonaqueous Electrolyte Battery)

Using the electrode group and the nonaqueous electrolyte produced as described above, a nonaqueous electrolyte battery of Example E was fabricated.

(Charge-and-Discharge Test)

The nonaqueous electrolyte battery of Example E was subjected to a charge-and-discharge test at room temperature. The charge-and-discharge test was performed at a charge and discharge current value of 0.2 C (hourly discharge rate) within a potential range of 1.8 V to 3.1 V as the battery voltage.

FIG. 15 shows a charge and discharge curve (charge curve 90, discharge curve 91) of the nonaqueous electrolyte battery of Example E. As apparent from FIG. 15, in the nonaqueous electrolyte battery of Example E, the voltage changes smoothly and moderately within a voltage range of 2.3 V to 3.0 V. That is, a nonaqueous electrolyte battery in which the voltage smoothly and moderately varies within a voltage range of 2.3 V to 3.0 V was obtained by using the product of Example A-1. When five of the nonaqueous electrolyte batteries are connected to each other in series, the operating voltage becomes higher than that obtained in a case using a spinel type lithium titanate ($Li_4Ti_5O_{12}$) as the negative electrode, i.e., 15.1 V to 11.5 V, and thus, a battery pack having a voltage compatible with a 12 V lead storage battery for automobiles can be fabricated.

According to at least one embodiment and Example described above, an active material including a particle of a composite oxide having an orthorhombic crystal structure is provided. The composite oxide is represented by the general formula $Li_{2+w}Na_{2-x}M1_yTi_{6-z}M2_zO_{14-\delta}$. The particle of the composite oxide has an average crystallite size of 50 nm to 90 nm and an average primary particle size of 0.1 μm to 0.6 μm. The composite oxide can exhibit a large variation in potential accompanied with a change in capacity within a potential range of 1.0 V (vs. $Li/Li^+$) to 1.5 V (vs. $Li/Li^+$) The average operating potential of the composite oxide can be controlled by changing the Na amount. Furthermore, particles of the composite oxide have high crystallinity while being of small particle size, and lithium ions easily diffuse within the active material, thus, a high input-output performance during charge-and-discharge can be realized. As a result, the active material can realize a secondary battery capable of exhibiting excellent input-output performance and easily performing voltage management.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising particles of a composite oxide, the composite oxide having an orthorhombic crystal structure, being represented by a general formula $Li_{2+w}Na_{2-x}M1_yTi_{6-z}M2_zO_{14+\delta}$, and having an average crystallite size of 50 nm to 90 nm and an average primary particle size of 0.1 μm to 0.6 μm, wherein M1 is at least one selected from the group consisting of Cs and K, M2 is at least one selected from the group consisting of Zr, Sn, V, Nb, Ta, Mo, W, Fe, Y, Co, Mn, and Al, w falls within $0 \leq w \leq 4$, x falls within $0 < x < 2$, y falls within $0 \leq y < 2$, z falls within $0 < z < 6$, and δ falls within $-0.5 \leq \delta \leq 0.5$.

2. The active material according to claim 1, wherein M2 is at least one cation selected from the group consisting of Fe, Y, Co, Mn, and Al as trivalent cations, Zr and Sn as tetravalent cations, V, Nb, and Ta as pentavalent cations, and Mo and W as hexavalent cations.

3. The active material according to claim 1, wherein the orthorhombic crystal structure belongs to a space group Fmmm, and M2 is at least one selected from the group consisting of V, Nb, and Ta as pentavalent cations.

4. The active material according to claim 1, wherein a value (nm) of the average crystallite size of the particles of the composite oxide is equal to or greater than ⅓ a value (nm) of the average primary particle size.

5. An electrode comprising the active material according to claim 1.

6. The electrode according to claim 5, further comprising an active material-containing layer that comprises the active material.

7. The electrode according to claim 6, wherein the active material-containing layer further comprises an electro-conductive agent and a binder.

8. A secondary battery comprising:
a negative electrode;
a positive electrode; and
an electrolyte,
wherein the negative electrode is the electrode according to claim 5.

9. A battery pack comprising the secondary battery (100) according to claim 8.

10. The battery pack according to claim 9 further comprising:
an external power distribution terminal; and
a protective circuit.

11. The battery pack according to claim 9, comprising plural of the secondary batteries, the secondary batteries being electrically connected in series, in parallel, or in a combination of in series and in parallel.

12. A vehicle comprising the battery pack according to claim 9.

13. The vehicle according to claim 12, which comprises a mechanism configured to convert kinetic energy of the vehicle into regenerative energy.

* * * * *